United States Patent [19]

Cwiakala et al.

[11] Patent Number: 5,170,472
[45] Date of Patent: Dec. 8, 1992

[54] DYNAMICALLY CHANGING A SYSTEM I/O CONFIGURATION DEFINITION

[75] Inventors: Richard Cwiakala, Wappingers Falls; Eugene P. Hefferon, Poughkeepsie; Kenneth J. Oakes, Wappingers Falls; Allen H. Preston, Poughkeepsie; David E. Stucki, Poughkeepsie; Leslie W. Wyman, Poughkeepsie; Harry M. Yudenfriend, Wappingers Falls, all of N.Y.

[73] Assignee: International Business Machines Corp., Armonk, N.Y.

[21] Appl. No.: 693,997

[22] Filed: Mar. 28, 1991

[51] Int. Cl.5 ............................................. G06F 13/00
[52] U.S. Cl. ................................................... 395/275
[58] Field of Search .................. 364/DIG. 1, DIG. 2; 395/275, 325

[56] References Cited

U.S. PATENT DOCUMENTS

| | | | |
|---|---|---|---|
| 4,589,063 | 5/1986 | Shah et al. | 395/275 |
| 4,604,690 | 8/1986 | Crabtree et al. | |
| 4,775,931 | 10/1988 | Dickie et al. | |
| 4,821,179 | 4/1989 | Jensen et al. | 395/275 |

FOREIGN PATENT DOCUMENTS 0364115 9/1989 European Pat. Off. .

OTHER PUBLICATIONS

North-Holland Microprocessing and microprogramming 18(1986) 455-462, Decuypere "Object Oriented System Supporting Dynamic Configuration".
IEEEE Transcriptions on Software Engineering, vol. SE-11, No. 4, Apr. 1985, Kramer et al "Dynamic Configuration for Distributed Systems".

Primary Examiner—Robert L. Richardson
Attorney, Agent, or Firm—Floyd A. Gonzalez

[57] ABSTRACT

A mechanism for changing the system I/O configuration definition in the channel subsystem of a data processing system without having to do a power on reset operation. The data processing system includes one or more central processing units, an I/O processor, a storage addressable by the central processors and the I/O processor, and a command mechanism for creating command-request blocks in the storage, each of which contains a requested command and data for the I/O Processor to add, delete or change elements of the I/O configuration definitions of the channel subsystem. Response-blocks are created in the storage for passing status information from the I/O processor to the central processing unit(s) indicating either successful execution of the requested command or that the I/O configuration definitions were unchanged by the command of the request-block, or when associated functions may have been performed in the execution of the command of the request-block by the I/O processor.

11 Claims, 7 Drawing Sheets

FIG. 3

| Word | | | | | |
|---|---|---|---|---|---|
| 0 | '00B8' | | 4011 | | |
| 1 | OC | Rsv | 00000000 | OCQ | Rsv | 00000000 |
| 2 | Key | Rsv | 00000000 00000000 00000000 | | | |
| 3 | 00000000 | 00000001 | Subchannel No. | | |
| 4 | Program Parameter | | | | |
| 8 | 00000000 00000000 00000000 00000000 | | | | |
| 9 | CHPID | CHPT | CHPC | 00000000 | |
| 10 | Candidate Prtns. | | Access Prtns. | | |
| 11 | Partition Names | | | | |
| 43 | SWTV | 00000000 00000000 00000000 | | | |
| 44 | SWTN | 00000000 00000000 00000000 | | | |
| 45 | 00000000 00000000 00000000 00000000 | | | | |

| Word | | |
|---|---|---|
| 0 | L2 | Response Code |
| 1 | 00000000 00000000 00000000 00000000 | |
| 2 | 00000000 00000000 00000000 | RQ |
| 3 | 00000000 00000000 00000000 00000000 | |

| Word | | | | | | |
|---|---|---|---|---|---|---|
| 0 | '0070' | | | '4013' | | |
| 1 | OC | Rsv | 00000000 | OCQ | Rsv | 00000000 |
| 2 | Key | Rsv | 00000000 00000000 00000000 | | | |
| 3 | 00000000 | 00000001 | Subchannel No. | | | |
| 4 | Program Parameter | | | | | |
| 8 | 00000000 00000000 00000000 00000000 | | | | | |
| 9 | CUN | | | CUIP | | CUC |
| 10 | CHPIDV | 00000000 00000000 00000000 | | | | |
| 11 | CHPID0 | | CHPID1 | CHPID2 | | CHPID3 |
| 12 | CHPID4 | | CHPID5 | CHPID6 | | CHPID7 |
| 13 | FLA0 | | | FLA1 | | |
| 14 | FLA2 | | | FLA3 | | |
| 15 | FLA4 | | | FLA5 | | |
| 16 | FLA6 | | | FLA7 | | |
| 17–24 | Unit Addresses | | | | | |
| 25 | 00000000 00000000 00000000 00000000 | | | | | |
| 26 | 00000000 00000000 00000000 00000000 | | | | | |
| 27 | 00000000 00000000 00000000 00000000 | | | | | |

0  2 4  8       16   20  24      31

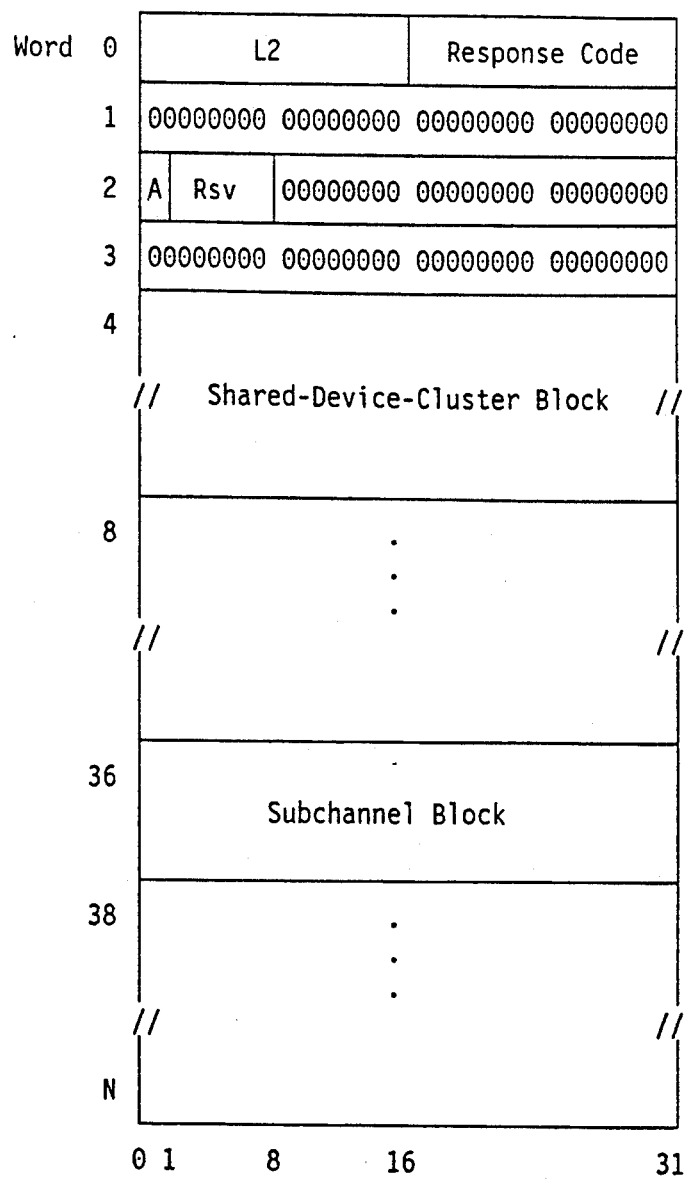

FIG. 8

| Word | 0 | Status | 00000000 | Device Number |
|---|---|---|---|---|
| | 1 | 00000000 | PN | SCH Number |

| Word | | | | | | | |
|---|---|---|---|---|---|---|---|
| 0 | '0048' | | | '4015' | | | |
| 1 | OC | Rsv | 00000000 | OCQ | Rsv | 00000000 | |
| 2 | Key | Rsv | 00000000 00000000 00000000 | | | | |
| 3 | 00000000 | 00000001 | Subchannel No. | | | | |
| 4 | Program Parameter | | | | | | |
| 8 | 00000000 00000000 00000000 00000000 | | | | | | |
| 9 | Count | IODC | 00000000 | PCHP | | | |
| 10 | Unit Add | 00000000 | Device Number | | | | |
| 11 | CUNV | 00000000 | DNQ | | | | |
| 12 | CUN0 | | CUN1 | | | | |
| 13 | CUN2 | | CUN3 | | | | |
| 14 | CUN4 | | CUN5 | | | | |
| 15 | CUN6 | | CUN7 | | | | |
| 16 | 00000000 00000000 00000000 00000000 | | | | | | |
| 17 | 00000000 00000000 00000000 00000000 | | | | | | |

0  2 4  8   16  20  24   31

DYNAMICALLY CHANGING A SYSTEM I/O CONFIGURATION DEFINITION

BACKGROUND OF THE INVENTION

The present invention relates to changing a system input/output (I/O) configuration in a channel subsystem, and more particularly relates to changing the system I/O configuration dynamically such that the change is made with minimal disruption to the normal system operation without a power-on-reset (POR).

Large data processing installations typically have one or more systems (also referred to herein as central processing complexes), each having one or more central processing units (CPU's), each system having one or more attached I/O devices or being attached to other systems. Such systems are typically managed by a control program such as IBM's MVS/ESA operating system.

Since such a system has a high degree of modularity, it is a routine event to add, delete, or exchange I/O devices. A particular I/O configuration must be defined both to the system's hardware elements and operating system software, and a change to an I/O configuration occasioned by the addition, deletion, or change of a channel path, a control unit or an I/O device must be reflected in a change to the hardware and software definitions.

In the past, it has been a matter of some difficulty to change a system's I/O configuration without disrupting active processing of the system. A normal course of events would be to stop processing of work on the system, add, delete, or change the devices by performing the physical connection, disconnection, or reconnection, then POR the hardware and IPL the operating system to reestablish the correct software and hardware definitions, and again start the processing or work.

This process is unacceptably disruptive and expensive in most cases because it requires that the system be idle for a possibly long time period while the reconfiguration is performed. Schemes devised to reduce the impact on the system processing during such configuration changes include over-defining an I/O configuration by including definitions and related control blocks for spare devices which could then be utilized later when new devices are to be added. The number of such reserved definitions is a matter of careful planning and, in some cases, intelligent guess work. In this scheme, space is wasted by the reservation of unused control blocks, this scheme only allows for the addition and not the deletion of device definitions, and certain types of changes, such as correcting incorrect specifications of device type, would still require a system reinitialization. This scheme further requires device pathing information (i.e., channel-to-control-unit-to-device connections) to be specified at I/O configuration definition. If plans change, this device pathing information needs to be respecified and a subsequent POR and IPL is required to reinitialize the I/O configuration definition.

Other schemes provide for the dynamic addition of a device definition without pre-reservation of control blocks, but do not deal with device definition deletion since such a deletion poses the additional problem of the treatment of ongoing system work making use of the device to be deleted. The traditional method of dealing with this situation was to "quiesce" the system (completing ongoing work without starting new work) so that the device could be disconnected, and the device definition deleted, without adversely affecting ongoing processing. Still other schemes change the characteristics of existing device definitions, leaving unresolved the matter of whether or not active work must stop, and how to deal with device additions or deletions.

SUMMARY OF THE INVENTION

The present invention provides instructions from the central processing unit to the I/O configuration hardware for the addition, deletion and changing of the elements of the I/O configuration definitions. These instructions are executed by an I/O processor in the channel subsystem processor without disrupting the processing of the central processing complex, and without requiring a POR.

It is thus an object of the present invention to provide a mechanism for dynamically changing the hardware I/O configuration of a data processing system.

It is a further object of the present invention to provide a mechanism for instructing a channel subsystem to add, delete or change a definition of elements in an I/O configuration without a POR.

It is a further object of the present invention to provide a response mechanism from the channel subsystem to the central processing unit to indicate if the instruction for adding, deleting or changing of an element of an I/O configuration definition successfully completed.

These and other objects of the present invention will be apparent from the following more particular description of the preferred embodiment of the invention as illustrated in the drawings.

BRIEF DESCRIPTION OF THE DRAWINGS

FIG. 3 is a block diagram of a command-request block for a change-channel-path-configuration command;

FIG. 4 is a block diagram of a command-response block for the change-channel-path-configuration command;

FIG. 5 is a block diagram of a command-request block for a change-control-unit-configuration command;

FIG. 6 is a block diagram of a command-response block for the change-control-unit-configuration command;

FIG. 7 is a block diagram of a shared device cluster block;

FIG. 8 is a block diagram of a subchannel block;

FIG. 9 is a block diagram of a command-request block for a change-I/O-device configuration command.

DESCRIPTION OF THE PREFERRED EMBODIMENT

Figure 1:
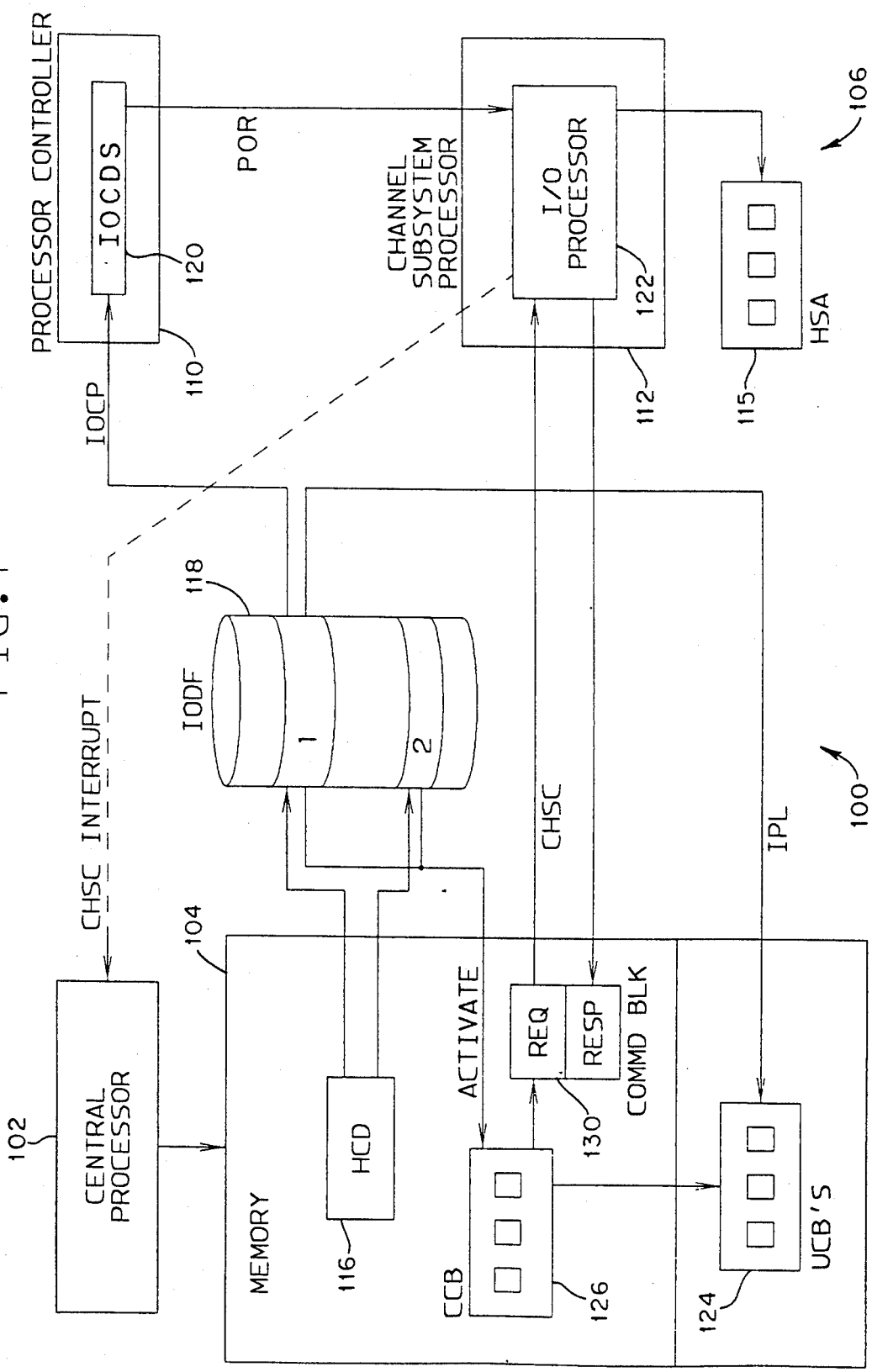
FIG. 1 is a block diagram showing a central processing complex having a central processing unit, a processor controller and a channel subsystem processor, wherein instruction are sent to the channel subsystem processor for adding, deleting or changing I/O definitions in the I/O configuration.

FIG. 1 is a block diagram of a data processing system also referred to herein as a central processing complex (CPC) 100. The CPC 100 includes a central processing unit (CPU) 102, a main memory 104 and a processor controller. The memory 104 stores data and instructions arranged in programs, as is known. A control program such as IBM's MVS/ESA operating system typically manages the operation on the data processing system. The CPC 100 also includes a channel subsystem 106 which includes a channel subsystem processor 112, and a data storage which contains the system's hardware system area (HSA) storage 115. The HSA 115 is a storage area which contains data defining the configuration of the system hardware, and is typically in a non-program addressable part of the memory 104. For this reason, the HSA 115 is shown as separate from the memory 104, and may be thought of as a separate part of the channel subsystem 106.

As described in U.S. patent application Ser. No. 07/676,60 filed on the same date as the present invention and incorporated herein by reference, a hardware configuration definition (HCD) program 116 is a configuration defining program which creates a representation of the current system I/O configuration in an I/O definition file (IODF) 118 and a representation of a future configuration in the same or a different file. The present representation is designated 1, and the future representation is designated 2 in the IODF 118. An input/output configuration program (IOCP) takes a representation in the IODF and supplies it to the processor controller 110 to create an I/O configuration definition (IOCDS) data set 120 which is used by the hardware of the data processing system to define its configuration. At POR time, a microcoded I/O processor engine 122 in the channel subsystem processor 112 uses the IOCDS 120 to create a representation of the current system I/O configuration in the HSA 115. The HSA 115 is used by the hardware for all I/O functions of the channel subsystem 106 independent of the configuration in the software, to be discussed. The exact contents of the HSA 115 to represent the current system I/O configuration is dependent on the data processing system used, is well understood in the art, and will not be discussed further.

A common program storage area of the memory 104 contains unit control blocks (UCB's) 124 which define the I/O configuration for use by the software of the CPC 100. The configuration definition in the IODF 118 is used by the MVS/ESA operating system at initial program load (IPL) time to create the UCB's 124. The dichotomy between the hardware and the software will now be understood. If there is a change in the IODF 118 after the IOCP creates the IOCDS 120, this change will be reflected in the UCB's 124 at IPL, but will not be reflected in the HSA 115 at POR. An activate command in the HCD 116 compares the current definition designated 1 in the IODF 118 to the future definition designated 2, and creates a configuration change block (CCB) 126. The CCB 126 contains multiple entries, each of which contains the information necessary to change one of the UCBs 124 to make the software configuration conform to the future configuration definition 2.

A command block 130 is created in memory 104 from an entry in the CCB 126 and includes a command-request (REQ) block which contains the information to change the hardware configuration in the HSA 115. The address of the command block 130 is loaded into one of the general registers. A channel subsystem call (CHSC) instruction is then issued to instruct the I/O processor 122 to execute a desired command to change the HSA 115.

During the execution of a CHSC command, status information is stored in a command-response (RESP) block by the I/O processor 122. After execution of the CHSC command, a CHSC interrupt is made to the CPU 102 such that the CPU 102 can interrogate the RESP block of command block 130 to determine the status of the change requested by the CHSC command.

Figure 2:
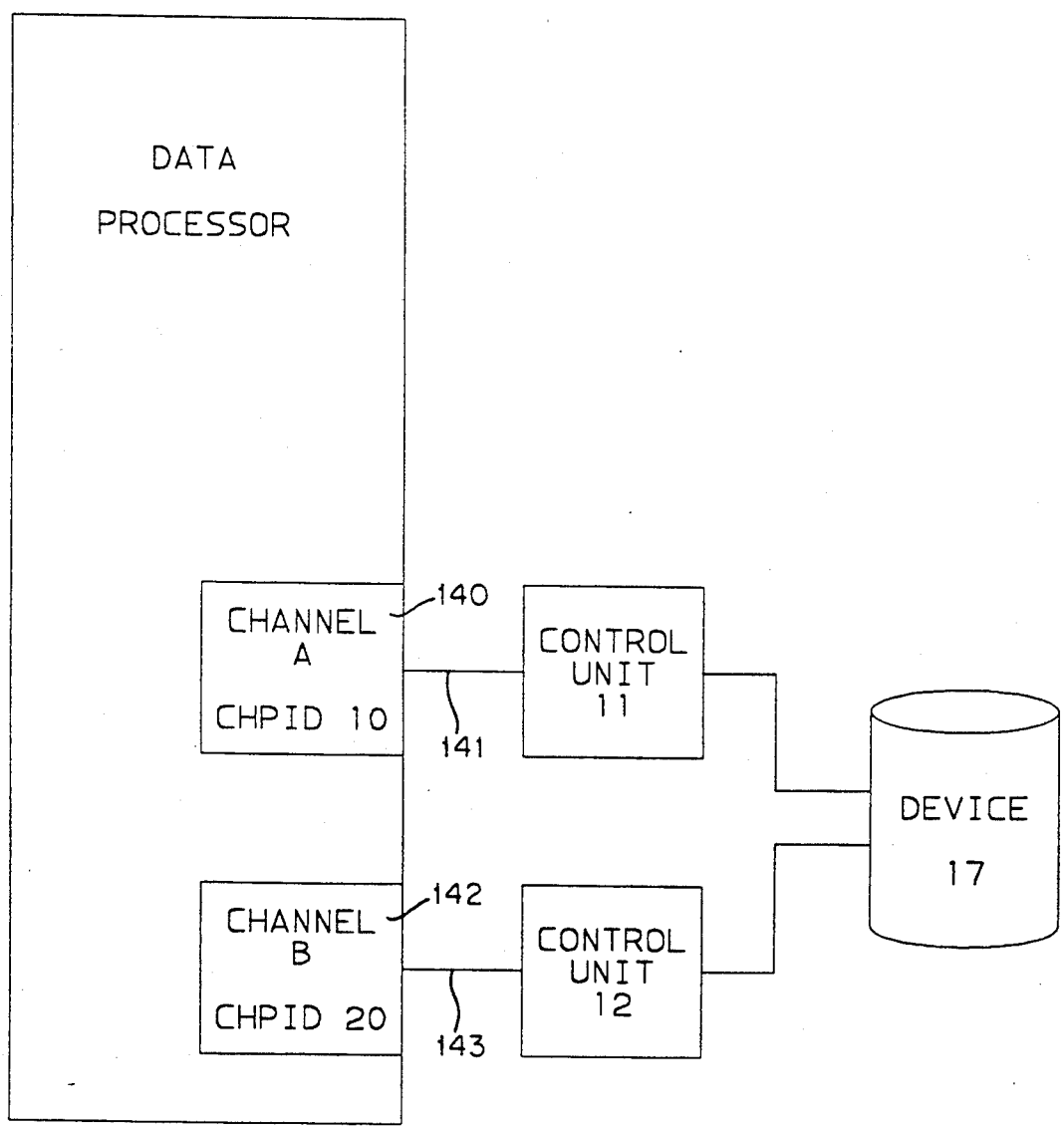
FIG. 2 is a block diagram representing the attachment of an I/O device to channels in a channel subsystem through control units on a channel path.

FIG. 2 is a block diagram of an example I/O configuration having an I/O device 17 connected to control units 11 and 12. Control unit 11 is connected to channel A 140 by a link 141, and control unit 12 is connected to channel B 142 by a link 143. The channels 140 and 142 are part of the channel subsystem 106 of FIG. 1, and are identified by channel path identification (CHPID) numbers. A channel path is defined as the path from a channel to a control unit and, in the present embodiment, is identified as CHPID 10 for channel A 140, and CHPID 20 for channel B 142. It will be understood that a channel path may contain a switch such as the dynamic switch available from IBM under its ESCON trademark. Each I/O device is attached to at least one subchannel, each identified by a unique subchannel number (17 in the present embodiment).

It will be understood that when the CPC 100 is in a logically partitioned (LPAR) mode, each of the channels 140 and 142 may be located in a separate partition, each having their corresponding unique subchannels used to access the common I/O device 17.

The CHSC commands of the present invention are the change-channel-path-configuration command, the change-control-unit-configuration command, and the change-I/O-device configuration command, and will now be described.

Change Channel-Path Configuration

The change-channel-path-configuration command is used to add or delete the description of a channel path in the I/O-configuration definition.

For the remaining description of this CHSC command, the term "I/O-configuration definition" is used to mean the I/O-configuration definition that is used by the channel subsystem to control I/O operations.

Specification of the operation to be performed and the information required to change the I/O-configuration definition are provided in the command-request block.

The following rules apply to the change-channel-path-configuration command:
For the add operation, the I/O-configuration definition must not already contain a description of the specified channel path.
For the add or delete operations, the I/O-configuration definition must not contain any control-unit descriptions that indicate that the associated control units are attached to the specified channel path.
For the add or delete operations, the channel subsystem must be operating in configuration mode.
For the delete operation, the I/O-configuration definition must contain a description of the specified channel path.

Coincidental with the successful addition of a channel-path description, the associated channel path is in the not-configured state. Whether that channel path is, more precisely, in the standby state, the reserved state, or the not-recognized state depends on the physical channel-path conditions that exist when the CHSC command is executed.

The command-request block for change channel-path configuration has the format shown in FIG. 3 wherein its contents are defined as follows:

L1: Bytes 0-1 of word 0 contain the value 00B8 hex, specifying a command-request-block length of 184 bytes.

Command Code: Bytes 2-3 of word 0 contain the value 4011 hex, specifying the change-channel-path-configuration command.

Operation Code (OC): Bits 0-1 of word 1 contain a value that specifies the type of channel-path configuration operation that is to be performed. The fields of the request-data area of the command-request block that are used are dependent upon the operation to be performed.

The contents of request-data-area fields that are not specified as being examined for possible use in performing the requested operation are ignored except for the reserved fields. The meaning of each value is as follows:

0 Add the description of the specified channel path to the I/O-configuration definition.

All of the fields are examined for use in performing the add operation.

1 Reserved

2 Delete the description of the specified channel path from the I/O-configuration definition.

The CHPID field is examined for use in performing the delete operation.

3 Reserved.

Add and delete operations cause the I/O-configuration-changed condition to be set in the channel subsystem.

Successful add and delete operations cause the channel subsystem to retain the specified program parameter, replacing the current program parameter, if any, in the channel subsystem.

An operation is considered to be successful when the channel subsystem attempts to store response code 0001 hex, even if that attempt is unsuccessful. For the remainder of the description of this CHSC command, any reference to response code 0001 hex being stored implicitly includes the case where the attempt to store that response code is unsuccessful.

Reserved: Bits 2-15 and 20-31 of word 1, bits 4-31 of word 2, word 8, byte 3 of word 9, bytes 1-3 of words 43 and 44, and word 45 are reserved and must be zeros.

Operation-Code Qualifier (OCQ): Bits 16-19 of word 1 contain a value that qualifies the operation specified by the OC field. The meaning of each value of the OCQ field is as follows:

0 The operation specified by the OC field is not qualified by the OCQ field.

1 All Partitions: All partitions are considered to be candidates to access the specified channel path independent of the contents of the candidate-partitions field. Words 10-42 are used only to construct a list of those partitions that are to have initial access to the specified channel path.

This OCQ value can be specified only when the OC field specifies the add operation and the CPC is in the logically partitioned (LPAR) mode.

2 Selected Partitions: Words 10-42 are used to construct a list of the partitions that are candidates to access the specified channel path and a list of the partitions that are to have initial access to the specified channel path.

This OCQ value can be specified only when the OC field specifies the add operation and the CPC is in LPAR mode.

3-15 Reserved.

Key: Bits 0-3 of word 2 contain the storage-access key used by the channel subsystem to access the command-request block and the command-response block for asynchronous operations that are initiated by the command.

Byte 1 of Word 3: Byte 1 of word 3 contains the value one.

Subchannel Number: Bytes 2-3 of word 3 contain the binary number of the CHSC subchannel that is used to perform operations that are asynchronous to CHSC execution.

Program Parameter: Words 4-7 contain a value that the program associates with this change-channel-path-configuration command.

Channel-Path Identifier (CHPID): Byte 0 of word 9 specifies the CHPID of the channel path that is the object of the change-channel-path-configuration command.

Channel-Path Type (CHPT): Byte 1 of word 9 specifies the type of the specified channel path. The valid combinations of bits are as follows:

| Bits 01234567 | Function |
|---|---|
| 00000000 | Reserved |
| 00000001 | Parallel block-multiplexer channel path |
| 00000010 | Parallel byte-multiplexer channel path |
| 00000011 | Serial-I/O channel path |
| 00000100 | Reserved |
| 00000101 | Reserved |
| 00000110 | Fiber-extended channel path |
| 00000111 | Native interface |

Other bit combinations are reserved.

Channel-Path Characteristics (CHPC): Byte 2 of word 9 specifies characteristics of the specified channel path. When one, the meaning of bits 0-7 is as follows:

| Bits | Meaning |
|---|---|
| 0 | CTCA: The specified channel path can be used to provide access to a channel-to-channel adapter in the CPC that contains the specified channel path. This bit can be one, only when the CHPT field specifies a serial-I/O channel path. |
| 1-7 | Reserved |

Candidate Partitions: Bytes 0-1 of word 10 specify which of the eight-byte entries in the partition-names field contain a valid partition name. Each valid partition name identifies a partition that is a candidate for having access to the specified channel path. Bits 0-15 of the candidate-partitions field correspond from left to right, with each of the 16 eight-byte entries in the partition-names field. The candidate-partitions field has meaning only when the OCQ field contains a value of 1 or 2.

Access Partitions: Bytes 2-3 of word 10 specify which of the partition designated by valid partition names are to have initial access to the specified channel path. Bits 0-15 of the access-partitions field correspond from left to right, with each of the 16 eight-byte entries in the partition-names field. The bits that are set to ones in the access-partitions field must be a subset of the bits that are set to ones in the candidate-partitions field. The access-partitions field has meaning only when the OCQ field contains a value of 1 or 2.

Partition Names: Beginning with byte 0 of the partition-names field, each of the 16 contiguous eight-byte fields can contain an eight-character (EBCDIC) partition name. The eight-byte fields that contain valid partition names are determined by bits that are ones in the candidate-partitions field. The partition names field has meaning only when the OCQ field contains a value of 1 or 2.

Switch Validity (SWTV): When one, bit 0 of byte 0 of word 43 specifies that the SWTN field contains valid information. When zero, bit 0 of byte 0 of word 43 specifies that the SWTN field does not contain valid information. Bits 1-7 of byte 0 of word 43 are reserved and must be zeros.

When the CHPT field specifies a parallel channel path, bit 0 of the SWTV field has no meaning and is ignored.

Switch Number (SWTN): When bit 0 of the SWTV field is one, byte 0 of word 44 contains a unique identifier of a switch on the specified channel path.

The command-response block for change channel-path configuration has the format shown in FIG. 4 wherein its contents are defined as follows:

L2: Bytes 0-1 of word 0 specify the length in bytes of the command-response block. The length depends on the response code that is stored as a result of the attempt to execute the change-channel-path-configuration command.

If a response code other than 0001 hex is stored in the response-code field, L2 specifies a length of eight bytes for the command-response block. If a response code of 0001 hex is stored in the response-code field, L2 specifies a length of 16 bytes.

Response Code: Bytes 2-3 of word 0 contain a 16-bit unsigned binary integer that describes the results of the attempt to execute the change-channel-path-configuration command. The valid response codes are 0001, 0003, and 0004 hex, and the command-specific response codes listed below in the section Special Conditions.

When the response-code field contains 0001 hex, the channel subsystem has successfully completed the requested change to the I/O-configuration definition.

When the response-code field contains a response code other than 0001 hex, no change is made to the I/O-configuration definition, the I/O-configuration-changed condition in the channel subsystem is not affected, and the contents of the program-parameter field are ignored.

When execution of the change-channel-path-configuration command results in condition code 1 being set, the channel subsystem has been given the initiative to asynchronously attempt to perform the requested change to the I/O-configuration definition. The completion of that attempt is indicated by means of a CHSC-subchannel I/O interruption with the results of the attempt specified by the response code in the command-response block.

Reserved: Words 1 and 3, and bits 0-23 of word 2 are reserved and are zeros.

Response Qualifier (RQ): When the response-code field contains 0001 hex, indicating that the requested configuration change has occurred, the response-qualifier field contains a value that provides information about conditions associated with that change. The meaning of each value is as follows:

0 There are no special conditions associated with the configuration change.
1 The information provided by the program for the configuration change does not match the physical configuration.
2-255 Reserved.

Special Conditions

A special condition exists if a response code other than 0001 hex is stored in the response-code field of the command-response block. When a special condition is indicated, the I/O-configuration definition is unchanged. The description of each special condition is followed by symbols that specify characteristics of the associated response code. The symbols and their meanings are as follows:

| Symbol | Meaning |
| --- | --- |
| A | The response code can be specified when the operation code specifies an add operation. |
| D | The response code can be specified when the operation code specifies a delete operation. |

The special-condition response codes for the change-channel-path-configuration command are as follows:

'0003': Response code 0003 hex is presented for the following reasons: (A,D)

The L1 field contains a value other than 00B8 hex.
The OC field contains a value of one or 3.
Bits 2-15 and 20-31 of word 1, bits 4-31 of word 2, word 8, byte 3 of word 9, bytes 1-3 of words 43 and 44, and word 45 are not all zeros.

'0004': Response code 0004 hex is presented if the command is not installed on the model. (A,D)

'0102': Response code 0102 hex specifies that the channel subsystem is not in configuration mode. (A,D)

'0103': Response code 0103 hex is presented for the following reasons: (A)

The CHPT field contains a value of zero, 4, or 5, or a value greater than 7.
Bits 1-7 of the CHPC field are not all zeros.
Bits 1-7 of the SWTV field are not all zeros.
Bit 0 of the CHPC field is one, specifying access to a CTCA, but the CHPT field does not specify a serial-I/O channel path.

'0104': Response code 0104 hex specifies that the CPC is in LPAR mode, the OCQ field contains a value of 2, and either or both of the candidate-partitions or access-partitions fields contain all zeros. (A)

'0106': Response code 0106 hex specifies that the specified channel path cannot be added because it is already described in the I/O-configuration definition. (A)

'0107': Response code 0107 hex is presented for the following reasons: (A)

The bits that are ones in the access-partitions field are not a subset of the bits that are ones in the candidate-partitions field.

The combination of candidate and access partitions specified by the candidate-partitions and access-partitions fields is not supported by this model.

The partition names in the partition-names field are not unique.

The partitions identified by one or more of the specified partition names are not described in the I/O-configuration definition.

'0108': Response code 0108 hex is presented for the following reasons: (A,D)

The OCQ field contains a value greater than 2.

The OC field specifies the add operation and the CPC is in LPAR mode, but the OCQ field does not contain a value of one or 2.

The OC field specifies the add operation, the OCQ field contains a value of one or 2, and the CPC is not in LPAR mode.

The rules for allowable combinations of values in the OC and OCQ fields are not satisfied.

'0109': Response code 0109 hex specifies that the channel subsystem does not have adequate resources to accommodate the requested change to the I/O-configuration definition. (A)

'010A': Response code 010A hex specifies that the specified channel path is not described in the I/O-configuration definition. (D)

'010B': Response code 010B hex specifies that the I/O-configuration definition contains one or more control-unit descriptions that indicate that they are attached to the specified channel path. (D)

'010C': Response code 010C hex specifies that the CPC is in LPAR mode and the specified channel path is the only channel path for one or more partitions. (D)

'010D': Response code 010D hex specifies that the requested change to the I/O-configuration definition is not supported on this model. (A,D)

'010F': The specified channel path is in a model-dependent state that prevents it from being deleted. (D)

'0110': A condition exists in the CPC that prevents the channel subsystem from obtaining the resources required to make the requested configuration change. For example, the CPC is in LPAR mode, the service processor is in the process of being initialized, and the LPAR hypervisor is unable to serialize the requested configuration change with other configuration-related operations performed by the service processor. (A,D)

'0111': Response code 0111 hex specifies that the requested change to the I/O configuration would result in an ambiguous or invalid configuration description. (A,D)

Change Control-Unit Configuration

The change-control-unit-configuration command is used to add, modify, or delete the description of a control unit in the I/O-configuration definition.

For the remainder of the description of this CHSC command, the term "I/O devices" is used to mean one or more I/O devices. The term "I/O-configuration definition" is used to mean the I/O-configuration definition that is used by the channel subsystem to control I/O operations. The term "change-configuration commands" refers to the set of commands consisting of the change-I/O-device-configuration command, the change-control-unit-configuration command, and the change-channel-path-configuration command.

Specification of the operation to be performed and the information required to change the I/O-configuration definition are provided in the command-request block.

The following rules apply to the change-control-unit-configuration command:

For the add operation, the I/O-configuration definition must not already contain a description of the specified control unit.

For the add operation and some modify operations, the I/O-configuration definition must contain a description of specified channel paths.

For add or delete operations, the I/O-configuration definition must not contain any I/O-device descriptions that indicate that the associated I/O devices are attached to the specified control unit.

For the modify or delete operations, the I/O-configuration definition must contain a description of the specified control unit.

For add, modify, or delete operations, the channel subsystem must be operating in configuration mode.

The command-request block for change control-unit configuration format has the format shown in FIG. 5 wherein its contents are defined as follows:

L1: Bytes 0–1 of word 0 contain the value 0070 hex, specifying a command-request-block length of 112 bytes.

Command Code: Bytes 2–3 of word 0 contain the value 4013 hex, specifying the change-control-unit-configuration command.

Operation Code (OC): Bits 0–1 of word 1 contain a value that specifies the type of control-unit configuration operation that is to be performed. The fields of the request-data area of the command-request block that are used is dependent upon the operation to be performed. The contents of request-data-area fields that are not specified as being examined for possible use in performing the requested operation are ignored except for the reserved fields. The meaning of each value is as follows:

0 Add the description of the specified control unit to the I/O-configuration definition.

All of the fields are examined for use in performing the add operation.

1 Modify the description of the specified control unit in the I/O-configuration definition. The type of modification is specified by the operation-code qualifier (OCQ).

The CUN field is used to identify the control unit for which the description is to be modified. Additional fields may be used, depending on the contents of the OCQ field. Additional fields that are used are identified in the descriptions of the OCQ values.

2 Delete the description of the specified control unit from the I/O-configuration definition.

The CUN field is examined for use in performing the delete operation.

3 Store additional information. One or more shared-device-cluster (SDC) blocks or subchannel blocks, or both, that could not be contained in the command-response block for a previous change-control-unit-configuration command are requested.

When the OC field contains a value of 3, no change is made to the I/O-configuration definition.

The contents of all of the request-data-area fields except the reserved fields are ignored.

Add, modify, and delete operations cause the I/O-configuration-changed condition to be set in the channel subsystem.

Successful add, modify, and delete operations cause the channel subsystem to retain the specified program parameter, replacing the current program parameter, if any, in the channel subsystem.

An operation is considered to be successful when the channel subsystem attempts to store response code 0001 hex, even if that attempt is unsuccessful. For the remainder of the description of this CHSC command, any reference to response code 0001 hex being stored implicitly includes the case where the attempt to store that response code is unsuccessful.

Reserved: Bits 2–15 and 20–31 of word 1, bits 4–31 of word 2, word 8, bytes 1–3 of word 10, bits 2–7 and 16–23 of words 17–24, and words 25–27 are reserved and are zeros.

Operation-Code Qualifier (OCQ): Bits 16–19 of word 1 contain a value that qualifies the operation specified by the OC field. The meaning of each value of the OCQ field is as follows:

0 The operation specified by the OC field is not qualified by the OCQ field.

1 Add channel-path access: The I/O-configuration definition is to be modified by adding one or more channel paths to the current list of channel paths that can be used to access the specified control unit.

Subchannels that are added as a result of the modify (add channel-path access) operation are in the initialized state and are not enabled.

When one or more channel paths that are in the configured state are placed on the list of channel paths that can be used to access the specified control unit, the corresponding bits of the path-installed mask (PIM) and the path-available mask (PAM) for subchannels associated with I/O devices that are described as being attached to the specified control unit are set to ones. If the channel paths are in the not-configured state, only the appropriate PIM bits are set to ones.

This OCQ value can be specified only when the OC field specifies the modify operation.

The CHPIDV and CHPID fields are used for this modify operation. The FLA fields are used when the corresponding channel paths are serial-I/O channel paths, and the link-address portions of the FLA fields may be used (depending on the model) when the corresponding channel paths are fiber-extended channel paths. The CHPIDV field must contain at least one bit that is one. Each valid CHPID field specifies a channel path that is to be added to the list of channel paths for the specified control unit. When FLA fields are used, the FLA field that is associated with each valid CHPID field is also valid and is used to establish the identity of the specified control unit on the channel path specified by the CHPID field.

2 Delete channel-path access: The I/O-configuration definition is to be modified by deleting one or more channel paths from the current list of channel paths that can be used to access the specified control unit.

Subchannels that are deleted as a result of the modify (delete channel-path access) operation have the device-number-valid bit set to zero.

When one or more channel paths are deleted from the list of channel paths that can be used to access the specified control unit, the corresponding bits of the path-installed mask (PIM) and the path-available mask (PAM) for subchannels associated with I/O devices that are described as being attached to the specified control unit are set to zeros.

This OCQ value can be specified only when the OC field specifies the modify operation.

The CHPIDV, and CHPID fields are used for this modify operation. The CHPIDV field must contain at least one bit that is one. Each valid CHPID field specifies a channel path that is to be deleted from the list of channel paths for the specified control unit.

If the removal of access for a channel path results in the removal of a preferred channel path for one or more I/O devices that are described as being attached to the specified control unit, it is as if no preferred path had been defined when those I/O devices were initially described in the I/O-configuration definition. If the affected I/O devices are to once again have preferred channel paths for I/O operations, it is necessary to change the description of those I/O devices.

3 Add unit address: The I/O-configuration definition is to be modified by adding one or more unit addresses to the current list of unit addresses that are recognized by the specified control unit.

This OCQ value can be specified only when the OC field specifies the modify operation.

The unit-address field is used for this modify operation. The unit-address field must contain at least one word with a non-zero ET field.

4 Delete unit address: The I/O-configuration definition is to be modified by deleting one or more unit addresses from the current list of unit addresses that are recognized by the specified control unit.

This OCQ value can be specified only when the OC field specifies the modify operation.

The unit-address field is used for this modify operation. The unit-address field must contain at least one word with a non-zero ET field.

5–15 Reserved.

Key: Bits 0–3 of word 2 contain the storage-access key used by the channel subsystem to access the command-request block and the command-response block for asynchronous operations that are initiated by the command.

Byte 1 of Word 3: Byte 1 of word 3 contains the value one.

Subchannel Number: Bytes 2–3 of word 3 contain the binary number of the CHSC subchannel that is used to perform operations that are asynchronous to CHSC execution.

Program Parameter: Words 4–7 contain a value that the program associates with this change-control-unit-configuration command.

Control-Unit Number (CUN): Bytes 0–1 of word 9 specify a number that is used to identify the control unit that is the object of the change-control-unit-configuration command.

0 Control-Unit-Interface Protocol (CUIP): Byte 2 of word 9 specifies the type of protocol used by the specified control unit to communicate on external interfaces. The meaning of each value is as follows:

0 Direct-current (DC) interlock (applies only to parallel channel attachment).

3-megabyte-per-second data streaming (applies only to parallel channel attachment).

2 4.5 megabyte-per-second data streaming (applies only to parallel channel attachment).

3 Serial-I/O protocols.

4–255 Reserved.

Control-Unit Characteristics (CUC): Byte 3 of word 9 specifies characteristics of the specified control unit. The meaning of bits 0-7 is as follows:

| Bits | Meaning |
|---|---|
| 0 | Concurrency level of I/O requests: When zero, this bit specifies that the control unit supports only one I/O request at a time. When one, this bit specifies that the control unit supports multiple I/O requests concurrently. The concurrency-level bit has meaning only when the channel paths to which the control unit is attached are parallel channel paths. Otherwise, the concurrency-level bit is ignored. |
| 1-7 | Reserved. |

Channel-Path-Identifier Validity (CHPIDV): Byte 0 of word 10 specifies which of the CHPID and FLA fields (if applicable) contain valid information.

Bits 0-7 of the CHPIDV field correspond, from left to right, to each of the eight CHPID fields. When one, a CHPIDV bit specifies that the corresponding CHPID field contains a valid channel-path identifier. When the corresponding channel paths are serial-I/O-type channel paths or (depending on the model) fiber-extended channel paths, the FLA field that corresponds to each valid CHPID field contains valid information. When zero, a CHPIDV bit specifies that the corresponding CHPID field does not contain a valid channel-path identifier. The FLA field that corresponds to each invalid CHPID field does not contain valid information.

When the OC field specifies the add operation, the CHPIDV field must not contain all zeros.

When the OC field specifies the modify operation and the OCQ field specifies add or delete channel-path access, the CHPIDV field must not contain all zeros.

Channel-Path Identifier (CHPID): Words 11-12 contain up to eight one-byte channel-path identifiers. Each CHPID field that is specified as being valid by the contents of the CHPIDV field contains a unique channel-path identifier of a channel path that can be used to access the specified control unit.

The order in which channel paths (other than preferred channel paths) are selected by the channel subsystem to access I/O devices that are attached to the specified control unit is model dependent.

Full Link Address (FLA): Words 13-16 contain up to eight two-byte full link addresses for the specified control unit. Each two-byte field corresponds, one-for-one, with the CHPID field that is in the same relative position in the command-request block.

A full link address is the information that is contained in the destination-address field of frames that are received by the specified control unit, and in the source-address field of frames that are sent by the specified control unit.

Unit Addresses: Words 17-24 describe the I/O-device unit addresses that are recognized by the control unit.

Unit Addresses: Words 17-24 describe the I/O-device unit addresses that are recognized by the control unit. The format and contents of each word of the I/O-device-address field are as follows:

Entry Type (ET): Bits 0-1 contain a two-bit code that specifies the contents of the corresponding word. The ET values and their meanings are as follows:

0 The word contains no meaningful information.

1 The word defines a single unit address that is recognized by the control unit. Byte 3 contains the unit address and the contents of byte 1 are ignored.

2 The word defines a range of unit addresses that are recognized by the control unit. Byte 3 contains a unit address which determines the beginning of the range. Byte 1 specifies one less than the number of consecutive unit addresses that make up the range.

3 Reserved.

When the OC field specifies the add operation, the unit-address field must contain at least one full word entry with a nonzero ET field, and the specified unit addresses are used to establish the list of unit addresses that are recognized by the specified control unit.

When the OC field specifies the modify operation and the OCQ field specifies add unit address, the unit-address field must contain at least one full word entry with a nonzero ET field, and the specified unit addresses are added to the current list of unit addresses that are recognized by the specified control unit.

When the OC field specifies the modify operation and the OCQ field specifies delete unit address, the unit-address field must contain at least one full word entry with a nonzero ET field, and the specified unit addresses are deleted from the current list of unit addresses that are recognized by the specified control unit.

Reserved: Bits 2-7 and byte 2 are reserved and contain zeros.

Count: Bits 8-15.

Unit Add: Bits 24-31

The command-response block for change control-unit configuration has the format shown in FIG. 6 wherein its contents is defined as follows:

L2: Bytes 0-1 of word 0 specify the length in bytes of the command-response block. The length depends on the response code that is stored in the response-code field as a result of the attempt to execute the change-control-unit-configuration command, and on the type and amount of information to be stored when a response code of 0001 hex is stored.

When a response code of 0001 hex is stored in the response-code field, eight 16-byte shared-device-cluster (SDC) blocks are stored and one or more eight-byte subchannel blocks may be stored in the response-data area of the response block. The L2 field specifies a command-response-block length of 144 bytes, plus eight bytes for every subchannel block (if any) that is stored.

When a response code other than 0001 hex is stored in the response-code field, no SDC blocks or subchannel blocks are stored as a result of the attempt to execute the command, and L2 specifies a length of eight bytes for the command-response block.

Response Code: Bytes 2-3 of word 0 contain a 16-bit unsigned binary integer that describes the results of the attempt to execute the change-control-unit-configuration command. The valid response codes are 0001, 0003, 0004 hex, and the command-specific response codes listed below in the section Special Conditions.

When the OC field of the command-request block specifies the add, modify, or delete operation and the response-code field contains 0001 hex, the channel subsystem has successfully completed the requested change to the I/O-configuration definition.

When the OC field of the command-request block specifies the store-additional-information operation and the response-code field contains 0001 hex, or when the response-code field contains a response code other than 0001 hex (regardless of the contents of the OC field), no change is made to the I/O-configuration definition, the I/O-configuration-changed condition in the channel subsystem is not affected, and the contents of the program-parameter field are ignored.

When execution of the change-control-unit-configuration command results in condition code 1 being set, the channel subsystem has been given the initiative to asynchronously attempt to perform the requested change to the I/O-configuration definition. The completion of that attempt is indicated by means of a CHSC-subchannel I/O interruption with the results of the attempt specified by the response code in the command-response block.

Reserved: Words 1 and 3 and bits 1–31 of word 2 contain zeros.

Additional Information (A): When one, bit 0 of word 2 specifies that the channel subsystem has additional shared-device-cluster (SDC) blocks or additional subchannel blocks that cannot be contained in this command-response block. When zero, bit 0 of word 2 specifies that the channel subsystem has no SDC or subchannel blocks in addition to those, if any, that are contained in this command-response block.

The execution of a change-control-unit-configuration command that specifies the modify (add or delete channel-path access) operation can result in the creation of more SDC or subchannel blocks than can be contained in the command-response block. In this case, the channel subsystem creates a set of command-response blocks. The first of the set of command-response blocks is provided as part of the execution of the change-control-unit-configuration command that caused the set of command-response blocks to be created. The program can obtain the remaining command-response blocks by repeatedly executing the change-control-unit-configuration command with the store-additional-information operation specified. The last command-response block of the set has an A bit that is zero.

If the program continues to request additional command-response blocks after all of the command-response blocks of a set have been stored, the channel subsystem continues to provide them by starting at the beginning of the set and providing them in the same order as they were previously provided. The set of command-response blocks is discarded by the channel subsystem when the first attempt is made to execute any change-configuration command other than the change-control-unit-configuration command (with an OC field that specifies the store-additional-information operation) following the command that caused the set of command-response blocks to be created.

Shared-Device-Cluster (SDC) Blocks: Words 4–35 contain eight 16-byte shared-device-cluster (SDC) blocks. Each SDC block that is specified as being valid describes a shared device cluster that contains one or more I/O devices that are described as being attached to the control unit specified in the command-request block of the change-control-unit-configuration command that caused the SDC block to be created.

A shared device cluster is either a single control unit that provides access to at least one I/O device but does not share access to I/O devices with any other control unit, or it is a collection of control units and I/O devices that are connected in such a way that for any division of the total collection of control units into two subsets, at least one I/O device is shared by at least one control unit from each subset.

The SDC block has the format shown in FIG. 7 wherein its contents are defined as follows:

SDC Validity Bit (S): When one, bit 0 of word 0 specifies that the associated SDC block is valid. When zero, bit 0 of word 0 specifies that the associated SDC block is not valid and there are no subsequent SDC blocks in the command-response block that are valid.

PN Validity Bit (P): When one, bit 1 of word 0 specifies that the PN field contains a valid partition number. When zero, bit 1 of word 0 specifies that the contents of the PN field are meaningless. The P bit can be one only when the CPC is in LPAR mode.

Reserved: Bits 2–15 of word 0 and byte 0 of word 1 are reserved and contain zeros.

Shared-Device-Cluster (SDC) Number: Bytes 2–3 of word 0 contain an SDC number that identifies the shared device cluster described by this SDC block. Within an I/O-configuration definition every SDC has a unique number.

Partition Number (PN): When the CPC is in LPAR mode and the P bit is one, byte 1 of word 1 contains the partition number of the partition from which the specified SDC is recognized.

Path Mask - 1 (PM-1): Byte 2 of word 1 specifies the CHPID fields in words 2–3 that identify all of the channel paths that are described in the I/O-configuration definition for the specified SDC. Each bit of the PM-1 field corresponds one-for-one, by relative position, with each of the CHPID fields in words 2–3. A PM-1 bit stored as one specifies that the contents of the corresponding CHPID field identifies a channel path for the specified SDC. A PM-1 bit stored as zero specifies that the contents of the corresponding CHPID field have no meaning.

Path Mask - 2 (PM-2): When the CPC is in LPAR mode, byte 3 of word 1 specifies the CHPID fields in words 2–3 that identify the channel paths that are configured to the specified partition for the specified SDC. Each bit of the PM-2 field corresponds one-for-one, by relative position, with each of the CHPID fields in words 2–3. A PM-2 bit stored as one specifies that the contents of the corresponding CHPID field identifies a channel path for the specified SDC and the specified partition. A PM-2 bit stored as zero specifies that the contents of the corresponding CHPID field have no meaning.

A PM-2 bit can be one only if the corresponding bit of the PM-1 field is one. When the CPC is operating in native mode, the PM-2 field has no meaning.

Channel-Path Identifiers (CHPIDs): Words 2–3 contain eight one-byte CHPID fields. The CHPID fields that correspond to the bits of the PM-1 field that are ones contain the CHPIDs of channel paths for the specified SDC. The contents of CHPID fields that correspond to the bits of the PM-1 field that are zero are meaningless.

Subchannel Blocks: When the L2 field contains a value greater than 0090 hex, words 36-N contain one or more eight-byte subchannel blocks. Each subchannel block describes a subchannel that is affected by the requested change to the I/O configuration.

The subchannel block has the format shown in FIG. 8 wherein its contents are defined as follows:

Status: Byte 0 of word 0 contains information about the status of the corresponding I/O device. The meaning of bits 0–7 is as follows:

0 When one, bit 0 of word 0 specifies that the installed parameters for the specified subchannel have been set to the initialized state. When zero, bit 0 of word 0 specifies that the installed parameters for the specified subchannel have been modified but they are not set to the initialized state.

1 When one, bit 1 of word 0 specifies that the PN field contains a valid partition number. When zero, bit 1 of word 0 specifies that the contents of the PN field are meaningless. This bit can be one only when the CPC is in LPAR mode.

2 When the OC field of the command-request block of the change-control-unit-configuration command that caused this subchannel block to be created, specifies the modify (delete channel-path access) operation, bit 2 specifies whether a dedicated-allegiance condition existed or whether the channel subsystem was in the process of accepting status that contains unit check when the modify (delete channel-path access) operation was performed for the specified I/O device. When zero, bit 2 specifies that a dedicated-allegiance condition did not exist. When one, bit 2 specifies that a dedicated-allegiance condition did exist, and bit 3 of the status field specifies whether the channel subsystem was able to clear the associated contingent-allegiance condition at the device.

When the OC field of the command-request block of the change-control-unit-configuration command that caused this subchannel block to be created does not specify the modify (delete channel-path access) operation, bit 2 has no meaning.

3 When bit 2 of the status field has meaning and is one, bit 3 specifies whether the channel subsystem was able to clear the contingent-allegiance condition at the specified I/O device. When zero, bit 3 specifies that the channel subsystem was able to clear the contingent-allegiance condition (which could result in zero sense data). When one, bit 3 specifies that the channel subsystem was unable to clear the contingent-allegiance condition.

When bit 2 of the status field has no meaning or has meaning and is zero, bit 3 has no meaning.

4 When the OC field of the command-request block of the change-control-unit-configuration command that caused this subchannel block to be created specifies the modify (delete channel-path access) operation, bit 4 specifies whether an I/O operation was in progress when the modify (delete channel-path access) operation was performed for the specified I/O device. When zero, bit 4 specifies that an I/O operation was not in progress. When one, bit 4 specifies that an I/O operation was in progress, and bit 5 of the status field specifies whether the channel subsystem was able to terminate the I/O operation at the specified I/O device.

When the OC field of the command-request block of the change-control-unit-configuration command that caused this subchannel block to be created does not specify the modify (delete channel-path access) operation, bit 4 has no meaning.

5 When bit 4 of the status field has meaning and is one, bit 5 specifies whether the channel subsystem was able to terminate the I/O operation at the specified I/O device. When zero, bit 5 specifies that the channel subsystem was able to terminate the I/O operation at the I/O device. When one, bit 5 specifies that the channel subsystem was unable to terminate the I/O operation at the I/O device.

When bit 4 of the status field has no meaning or has meaning and is zero, bit 5 has no meaning.

6 The OC field of the command-request block of the change-control-unit-configuration command that caused this subchannel block to be created, specifies the modify (delete channel-path access) operation, bit 6 specifies whether the enabled bit (bit 8 of word 1 of the PMCW) was one or zero for the specified subchannel when the channel subsystem started to perform the requested operation. When zero, bit 6 specifies that the enabled bit was zero. When one, bit 6 specifies that the enabled bit was one.

When the OC field of the command-request block of the change-control-unit-configuration command that caused this subchannel block to be created does not specify the modify (delete channel-path access) operation, bit 6 has no meaning.

7 When the OC field of the command-request block for the change-control-unit-configuration command that caused this subchannel block to be created specifies the modify (delete channel-path access) operation and the CPC is in LPAR mode, bit 7 specifies whether the interruption-interlock control bit (bit 24 of word 6 of the PMCW) was one or zero for the specified subchannel when the channel subsystem started to perform the requested operation. When zero, bit 7 specifies that the interruption-interlock bit was zero. When one, bit 7 specifies that the interruption-interlock bit was one.

When the OC field of the command-request block of the change-control-unit-configuration command that caused this subchannel block to be created, does not specify the modify (delete channel-path access) operation, bit 7 has no meaning.

Reserved: Byte 1 of word 0 and byte 0 of word 1 are reserved and contain zeros.

Device Number: Bytes 2–3 of word 0 contain the binary representation of the device number for the I/O device that is associated with the specified subchannel.

Partition Number (PN): When the CPC is in LPAR mode and bit 1 of the status field is one, byte 1 of word 1 contains the partition number of the partition with which the specified subchannel is associated. Otherwise, the contents of the PN field have no meaning.

Subchannel Number: Bytes 2–3 of word 1 specify the subchannel to which the information in this subchannel block applies.

Associated Functions

Depending on the operation specified by the OC and OCQ fields in the command-request block, and depending on the status of the I/O devices, if any, that are described as being attached to the specified control unit, when a response code of 0001 hex is stored in the command-response block, associated functions (other than changing the I/O-configuration definition) may have been performed. This section describes the associated functions and the conditions under which they occur.

In all cases described in this section that state the need for the channel subsystem to issue the clear signal to an I/O device, the rules for selecting a channel path (when the use of a specific channel path is not stated) and the actions for unusual conditions when attempting to select the I/O device are the same as for CLEAR SUB- CHANNEL. As with CLEAR SUBCHANNEL, the possibility exists that the channel subsystem cannot successfully issue the clear signal.

1. When the CPC is in LPAR mode, subchannels can be added by means of the modify (add channel-path access) operation because the associated I/O devices that are described as being attached to the specified control unit are accessed for the first time by one or more partitions. When this happens, partitions other than the partition associated with the execution of the change-control-unit-configuration command (except for System/370-mode partitions) are notified of this event by means of channel reports. A subchannel-installed-parameters-initialized channel report is presented to the other partitions for each applicable I/O device.
2. When the CPC is in LPAR mode, access to I/O devices that are described as being attached to the specified control unit can be modified by means of the modify (add or delete channel-path access) operation, such that they can be accessed differently by one or more partitions. When this happens, partitions other than the partition associated with the execution of the change-control-unit-configuration command (except for System/370-mode partitions) are notified of this event by means of channel reports. A subchannel-installed-parameters-modified channel report is presented to the other partitions for each applicable I/O device.
3. When the CPC is in LPAR mode, subchannels can be deleted as a result of the modify (delete channel-path access) operation because the associated I/O devices that are described as being attached to the specified control unit can no longer be accessed by one or more partitions. When this happens, partitions other than the partition associated with the execution of the change-control-unit-configuration command (except for System/370-mode partitions) are notified of this event by means of channel reports. A subchannel-installed-parameters-initialized channel report is presented to the other partitions for each applicable I/O device.

The following items describe associated functions that are performed as part of the modify (delete channel-path access) operation.

In all cases where the set of specified channel paths includes all channel paths for an affected subchannel (this can happen when the CPC is in LPAR mode), the subchannel is deleted from the I/O-configuration definition by means of setting the device-number-valid bit to zero. Unless specified otherwise, the operations described for each case are performed even though the subchannel is to be deleted. The term "affected subchannels" means the set of subchannels associated with the I/O devices that are described as being attached to the specified control unit. When access to the specified control unit by the specified channel paths is deleted, access to those I/O devices by the specified channel paths is also (implicitly) deleted.

4. The following operations are performed for each specified channel path that is a serial-I/O channel path:
a. Initiative, if any, to request stacked status is cleared.
b. Initiative, if any, to perform channel-initiated command retry is cleared.
c. Initiative, if any, to perform channel-initiated unit check is cleared.
d. The channel subsystem attempts to issue the remove-logical-path (RLP) link-control frame to the specified control unit. If the channel subsystem is unable to successfully issue the RLP frame, the channel subsystem issues the state-change-notification (SCN) signal. The channel subsystem retains initiative for either one of these actions until one of the actions is successful or an I/O-system reset occurs.
5. If an affected subchannel is idle when a request is made to delete access to the specified control unit by one or more channel paths, the channel subsystem examines the subchannel to determine whether a dedicated allegiance exists for that subchannel for one of the specified channel paths. If a dedicated allegiance exists, this condition is cleared, and an attempt is made to clear the associated contingent allegiance at the I/O device. The clear signal is issued on the last path used. If this path is unavailable (that is, its PAM bit is zero), then the clear signal is not issued.
6. If an affected subchannel is suspended or only function-pending when a request is made to delete access to the specified control unit by one or more channel paths, the channel subsystem examines the LPM, the PAM, and the set of specified channel paths to determine if one or more channel paths remain available for selection after access by the specified channel paths is deleted. If no channel path is available for selection, the subchannel remains suspended or function-pending and is made interruption-pending and status-pending with primary, secondary, and alert status. Channel-control check is indicated in the subchannel-status field, and ancillary report is indicated in the subchannel logout. If the subchannel is start-pending or resume-pending only, deferred condition code 3 is also indicated.

If the set of specified channel paths includes all of the channel paths for the subchannel (this can happen when the CPC is in LPAR mode), the operations described in the previous paragraph are not performed. Instead, the channel subsystem clears the suspended or function-pending condition, the associated functions (start, clear, halt) are not performed, and the subchannel is deleted from the I/O-configuration definition by means of setting the device-number-valid bit to zero.

7. If an affected subchannel is either subchannel-active or device-active only and disconnected when a request is made to delete access to the specified control unit by one or more channel paths, the channel subsystem may attempt to terminate the operation at the I/O device, depending on the circumstances described below.
a. If the subchannel is subchannel-active and connected and the connected channel path belongs to the set of specified channel paths, the channel subsystem clears the working allegiance and active allegiance at the subchannel and attempts to terminate the operation at the I/O device by issuing the clear signal on the connected channel path.
b. If the subchannel is subchannel-active and disconnected or device-active only and disconnected, the last path used is a channel path that belongs to the set of specified channel paths, and the subchannel is not operating in multi path mode, the channel subsystem clears the working allegiance at the subchannel and attempts to terminate the operation at the I/O device by issuing the clear signal on the last path used.

c. If the subchannel is subchannel-active and disconnected or device-active only and disconnected, the last path used is a channel path that belongs to the set of specified channel paths, and the subchannel is operating in multi path mode, the channel subsystem compares the set of specified channel paths with the set of channel paths in the implied path group. (The implied path group is determined by the ANDing of the logical path mask (LPM) and the path-available mask (PAM).) If all of the channel paths that belong to the implied path group are included in the set of specified channel the paths, channel subsystem clears the working allegiance at the subchannel for all of the channel paths in the implied path group and attempts to terminate the operation at the I/O device by issuing the clear signal on the last path used.

If the set of specified channel paths does not include all of the channel paths for the subchannel and the channel subsystem attempts to issue the clear signal to the I/O device (for the reasons just described), the subchannel is made interruption-pending and status-pending with primary (except when the subchannel was device-active only and disconnected), secondary, and alert status. Channel-control check is indicated in the subchannel-status field, and ancillary report is indicated in the subchannel logout.

8. If an affected subchannel is device-active only and connected when a request is made to delete access to the specified control unit by one or more channel paths and the connected channel path is included in the set of specified channel paths, the channel subsystem accepts the status. If the status includes unit check, the channel subsystem attempts to clear the contingent allegiance at the I/O device by issuing the clear signal in response to the status presentation, and a dedicated allegiance is not established for the subchannel.

If the set of specified channel paths does not include all of the channel paths for the subchannel, the subchannel is made status-pending with secondary status, and the device status accepted from the I/O device.

If the set of specified channel paths includes all of the channel paths for the subchannel (this can happen when the CPC is in LPAR mode), the status accepted from the I/O device is discarded, and the subchannel is not made status-pending.

9. If an affected subchannel is status-pending when a request is made to delete access to the specified control unit by one or more channel paths, the status includes unit check, and the associated dedicated allegiance is for a channel path that is included in the set of specified channel paths, then the dedicated-allegiance condition at the subchannel is cleared, and an attempt is made to clear the associated contingent allegiance at the I/O device. The channel subsystem attempts to issue the clear signal on the last path used.

If the set of specified channel paths includes all of the channel paths for the subchannel (this can happen when the CPC is in LPAR mode), the status is discarded, and the subchannel is no longer status-pending.

When the CPC is in LPAR mode and the CPC generates channel reports to reflect configuration changes (other than those associated with deleted I/O devices) as a result of executing the change-control-unit-configuration command, those channel reports are not made pending until the CPC stops operating in configuration mode. This is to prevent actions being taken in response to the channel reports before all of the intended I/O-configuration changes are complete.

Special Conditions

A special condition exists if a response code other than 0001 hex is stored in the response-code field of the command-response block. When a special condition is indicated, the I/O-configuration definition is unchanged. The description of each special condition is followed by symbols that specify characteristics of the associated response code. The symbols and their meanings are as follows:

| Symbol | Meaning |
| --- | --- |
| A | The response code can be specified when the operation code specifies an add operation. |
| M | The response code can be specified when the operation code specifies a modify operation. |
| D | The response code can be specified when the operation code specifies a delete operation. |
| S | The response code can be specified when the operation code specifies the store-additional-information operation. |

The special-condition response codes for the change-control-unit-configuration command are as follows:

The special-condition response codes for the change-control-unit-configuration command are as follows:

'0003': Response code 0003 hex is presented for the following reasons: (A,M,D,S)

The L1 field contains a value other than 0070 hex.

Bits 2-15 and 20-31 of word 1, bits 4-31 of word 2, word 8, bytes 1-3 of word 10, bits 2-7 and 16-23 of words 17-24, and words 25-27 are not all zeros.

'0004': Response code 0004 hex is presented if the command is not installed on the model. (A,M,D,S)

'0102': Response code 0102 hex specifies that the channel subsystem is not in configuration mode. (A,M,D,S)

'0103': Response code 0103 hex is presented for the following reasons: (A)

The control unit is already described in the I/O-configuration definition.

The CHPIDV field contains all zeros.

The CUIP field contains a value greater than 3.

Bits 1-7 of the CUC field are not all zeros.

The ET value for all of the words in the unit-address area is zero.

'0104': Response code 0104 hex is presented for the following reasons: (A)

A specified channel path is defined as a parallel-byte-multiplexer channel path, and bit 0 of the CUC field specifies that the control unit supports only one I/O request at a time.

The specified interface protocol for the control unit does not match the channel-path type for all of the specified channel paths.

'0105': Response code 0105 hex is presented for the following reasons: (A,M)

One or more of the specified channel paths are not described in the I/O-configuration definition.

One or more of the specified channel paths are defined as serial-I/O point-to-point channel paths that already have another control unit attached to them.

The valid CHPID fields do not contain unique values.

The mixture of channel-path types to which the control unit is to be attached is not supported by the channel subsystem.

One or more of the valid FLA fields specifies a full link address that is already being used for another control unit on the specified channel path.

One or more of the valid FLA fields contain the value 00 or FF hex in the link-address field, and the corresponding channel paths are defined as serial-I/O switched-point-to-point channel paths.

One or more of the valid FLA fields contain the value FF hex in the link-address field, and the corresponding channel paths are defined as serial-I/O point-to-point channel paths.

Two or more full-link-address (FLA) fields are valid, and they do not all contain the same logical address in bits 12-15.

Bits 8-11 of one or more of the valid FLA fields are not all zeros.

'0106': Response code 0106 hex is presented for the following reasons: (A,M)

The ET value for a unit-address word is 3.

The ET value for a unit-address word specifies a range, and the corresponding count field contains a value that, when applied to the specified unit address, would result in the specification of one or more unit addresses that are greater than 255.

The addition or deletion of unit addresses would result in a list of unit addresses that is not contained in a single range, and the channel subsystem does not support multiple unit-address ranges for the specified control unit in the context of the I/O-configuration definition.

The specified channel paths are defined as parallel channel paths, and the unit addresses that are specified in the unit-address field are not unique with respect to those that are recognized by other control units on the same channel paths.

'0107': Response code 0107 hex is presented for the following reasons: (A,M)

The number of specified unit-address ranges is such that when added to the number of unit-address ranges already defined for each of the specified channel paths, the result exceeds the number of unit-address ranges allowed for one or more channel paths.

The number of specified channel paths is such that when added to the number of channel paths, if any, that are already described as providing access to the specified control unit, the result exceeds the number of paths allowed.

The control unit exceeds the number of control units supported on one or more of the specified channel paths.

The control unit exceeds the number of control units supported on the system.

The number of specified channel paths is such that, when added to the number of channel paths, if any, that are already described as providing access to the shared device cluster that includes the specified control unit, the result exceeds the number of paths allowed.

'0108': Response code 0108 hex is presented for the following reasons: (M)

The OCQ field contains a value of zero or a value greater than 4.

The OCQ field specifies add channel-path access, but one or more of the specified channel paths are already described as providing access to the specified control unit.

The OCQ field specifies add unit address, but one or more of the specified unit addresses are already described as being recognized by the specified control unit.

The OCQ field specifies add or delete unit address, but all of the ET fields contain zeros.

The OCQ field specifies delete channel-path access, but one or more of the specified channel paths are not described as providing access to the specified control unit.

The OCQ field specifies add or delete channel path, but the CHPIDV field contains zeros.

The OCQ field specifies delete channel-path access, but the deletion would remove all remaining access to the specified control unit.

The OCQ field specifies delete unit address, but one or more of the specified unit addresses are not described as being recognized by the specified control unit.

The OCQ field specifies delete unit address, but the deletion would remove all remaining unit addresses that are recognized by the specified control unit.

The OCQ field specifies delete unit address, but one or more I/O devices are described as being accessed by the specified control unit using one or more of the specified unit addresses.

'0109': Response code 0109 hex specifies that the channel subsystem does not have adequate resources to accommodate the requested change to the I/O-configuration definition. (A,M)

'010A': Response code 010A hex specifies that the control unit is not described in the I/O-configuration definition. (M,D)

'010B': Response code 010B hex specifies that the I/O-configuration definition contains one or more I/O devices that are described as being accessed by the specified control unit. (D)

'010D': Response code 010D hex specifies that the requested change to the I/O-configuration definition is not supported on this model. (A,M,D)

'010F': Response code 010F hex specifies that the OC field specifies the store-additional-information operation but the channel subsystem has no SDC or subchannel blocks to store. (S)

'0110': A condition exists in the CPC that prevents the channel subsystem from obtaining the resources required to make the requested configuration change. For example, the CPC is in LPAR mode, the service processor is in the process of being initialized, and the LPAR hypervisor is unable to serialize the requested configuration change with other configuration-related operations performed by the service processor. (A,M,D)

'0111': Response code 0111 hex specifies that the requested change to the I/O configuration would result in an ambiguous or invalid configuration description. (A,M,D)

Change I/O-Device Configuration

The change-I/O-device-configuration command is used to add, modify, or delete the description of one or more I/O devices in the I/O-configuration definition.

For the remainder of the description of this CHSC command, the term "I/O devices" is used to mean one or more I/O devices. The term "I/O-configuration definition" is used to mean the I/O-configuration definition that is used by the channel subsystem to control I/O operations. The term "change-configuration commands refers" to the set of commands consisting of the change-I/O-device-configuration command, the change-control-unit-configuration command, and the change-channel-path-configuration command.

Specification of the operation to be performed and the information required to change the I/O-configuration definition is provided in the command-request block.

The following rules apply to the change-I/O-device-configuration command:

For the add operation, the I/O-configuration definition must not already contain a description of the specified I/O devices.

For the add operation and modify operations that change control-unit access for the specified I/O devices, one or more control units must be specified in the command-request block and those control units must be described in the I/O-configuration definition.

For the modify or delete operations, the I/O-configuration definition must contain a description of the I/O devices that are specified in the command-request block.

For add, modify, or delete operations, the channel subsystem must be operating in configuration mode.

The command-request block for change I/O-device configuration has the format shown in FIG. 9 wherein its contents are defined as follows:

L1: Bytes 0-1 of word 0 contain the value 0048 hex, specifying a command-request-block length of 72 bytes.

Command Code: Bytes 2-3 of word 0 contain the value 4015 hex, specifying the change-I/O-device-configuration command.

Operation Code (OC): Bits 0-1 of word 1 contain a value that specifies the type of I/O-device configuration operation that is to be performed. The fields of the request-data area of the command-request block that are used is dependent upon the operation to be performed. The contents of request-data-area fields that are not specified as being examined for possible use in performing the requested operation are ignored except for the reserved fields. The meaning of each value is as follows:

0 Add the description of the specified I/O devices to the I/O-configuration definition.

Subchannels that are added as a result of the add operation are in the initialized state and are not enabled.

When one or more channel paths that are in the configured state are placed on the list of channel paths that can be used to access the specified I/O devices, the corresponding bits of the path-installed mask (PIM) and the path-available mask (PAM) for each subchannel associated with the specified I/O devices are set to ones. If the channel paths are in the not-configured state, only the appropriate PIM bits are set to ones.

All of the fields except for the DNQ field are examined for use in performing the add operation.

1 Modify the description of the specified I/O devices in the I/O-configuration definition. The type of modification is specified by the operation-code qualifier (OCQ).

The count, unit-address, device-number, and DNQ fields are used to identify the I/O devices for which descriptions are to be modified. Additional fields may be used, depending on the contents of the OCQ field. Additional fields that are used are identified in the descriptions of the OCQ values.

2 Delete the description of the specified I/O devices from the I/O-configuration definition.

Subchannels that are deleted as a result of the delete operation have the device-number-valid bit set to zero.

The count, unit-address, device-number, and DNQ fields are the only fields that are examined for use in performing the delete operation.

3 Store additional information. One or more shared-device-cluster (SDC) blocks or subchannel blocks, or both, that could not be contained in the command-response block for a previous change-I/O-device-configuration command are requested.

When the OC field contains a value of 3, no change is made to the I/O-configuration definition.

The contents of all of the request-data-area fields except the reserved fields are ignored.

Add, modify, and delete operations cause the I/O-configuration-changed condition to be set in the channel subsystem.

Successful add, modify, and delete operations cause the channel subsystem to retain the specified program parameter, replacing the current program parameter, if any, in the channel subsystem.

An operation is considered to be successful when the channel subsystem attempts to store response code 0001 hex, even if that attempt is unsuccessful. For the remainder of the description of this CHSC command, any reference to response code 0001 hex being stored implicitly includes the case where the attempt to store that response code is unsuccessful.

Reserved: Bits 2-15 and 20-31 of word 1, bits 4-31 of word 2, word 8, byte 2 of word 9, byte 1 of words 10 and 11, and words 16-17 are reserved and contain zeros.

Operation-Code Qualifier (OCQ): Bits 16-19 of word 1 contain a value that qualifies the operation specified by the OC field. The meaning of each value of the OCQ field is as follows:

0 The operation specified by the OC field is not qualified by the OCQ field.

1 Add control-unit access: The I/O-configuration definition is to be modified by adding one or more control units to the current list of control units that can be used to access the specified I/O devices.

Subchannels that are added as a result of the modify (add control-unit access) operation are in the initialized state and are not enabled.

When one or more channel paths that are in the configured state are placed on the list of channel paths that can be used to access the specified I/O devices, the corresponding bits of the path-installed mask (PIM) and the path-available mask (PAM) for each subchannel associated with the specified I/O devices are set to ones. If the channel paths are in the not-configured state, only the appropriate PIM bits are set to ones.

This OCQ value can be specified only when the OC field specifies the modify operation.

The CUNV and CUN fields are used for this modify operation. The CUNV field must contain at least one bit that is one. Each valid CUN field specifies a control unit that is to be added to the list of control units for the specified I/O devices.

2 Delete control-unit access: The I/O-configuration definition is to be modified by deleting one or more control units from the current list of control units that can be used to access the specified I/O devices.

Subchannels that are deleted as a result of the modify (delete control-unit access) operation have the device-number-valid bit set to zero.

When one or more channel paths are deleted from the list of channel paths that can be used to access the specified I/O devices, the corresponding bits of the path-installed mask (PIM) and the path-available mask (PAM) for each subchannel associated with the specified I/O devices are set to zeros.

This OCQ value can be specified only when the OC field specifies the modify operation.

The CUNV and CUN fields are used for this modify operation. The CUNV field must contain at least one bit that is one. Each valid CUN field specifies a control unit that is to be deleted from the list of control units for the specified I/O devices.

If the removal of access for a control unit results in the removal of a preferred channel path for one or more I/O devices attached to the specified control unit, then it is as if no preferred path had been defined when those I/O devices were initially described in the I/O-configuration definition. If the affected I/O devices are to once again have preferred channel paths for I/O operations, it is necessary to change the description of those I/O devices.

3 Modify I/O-device characteristics: The characteristics of the specified I/O devices are to be replaced by the characteristics specified in the IODC field.

This OCQ value can be specified only when the OC field specifies the modify operation.

The IODC and PCHP fields are used for this modify operation.

4-15 Reserved.

Key: Bits 0-3 of word 2 contain the storage-access key used by the channel subsystem to access the command-request block and the command-response block for asynchronous operations that are initiated by the command.

Byte 1 of Word 3: Byte 1 of word 3 contains the value one.

Subchannel Number: Bytes 2-3 of word 3 contain the binary number of the CHSC subchannel that is used to perform operations that are asynchronous to CHSC execution.

Program Parameter: Words 4-7 contain a value that the program associates with this change-I/O-device-configuration command.

Count: Byte 0 of word 9 specifies one less than the number of I/O devices that are the object of the change-I/O-device-configuration command. Device numbers for the specified I/O devices are determined by using consecutive device numbers beginning with the value contained in the device-number field. Similarly, unit addresses for the specified I/O devices are determined using consecutive unit addresses beginning with the value contained in the unit-address field.

I/O-Device Characteristics (IODC): Byte 1 of word 9 specifies characteristics of the specified I/O devices. The contents of the IODC field are meaningful only when the OC field specifies the add operation or the modify operation and the OCQ field specifies modify I/O-device characteristics. The meaning of bits 0-7 is as follows:

| Bits | Meaning |
| --- | --- |
| 0 | Time Out: When zero, bit 0 specifies that the time-out function is not active for the specified I/O devices. When one, bit 0 specifies that the time-out function is active for the specified I/O devices. The time-out function is always active for I/O devices that can be accessed by means of serial-I/O channel paths, and the value of bit 0 is ignored for those I/O devices. |
| 1 | Status Verification: When zero, bit 1 specifies that status verification will not be performed for status that is presented by the specified I/O devices. When one, bit 1 specifies that status verification will be performed for status that is presented by the specified I/O devices. |
| 2 | Preferred Channel Path: When zero, bit 2 specifies that there is no preferred channel path that is to be used when there are I/O requests for the specified I/O devices, and the contents of the PCHP field have no meaning. When one, bit 2 specifies that there is a preferred channel path that is to be used when there are I/O requests for the specified I/O devices, and the contents of the PCHP field identify that channel path. |
| 3 | I/O-device-type specification: When zero, bit 3 indicates that the specified I/O devices are not direct-access-storage devices. When one, bit 3 indicates that the specified I/O devices are direct-access-storage devices. |
| 4-7 | Reserved. |

Preferred Channel Path (PCHP): When the contents of the IODC field are valid and bit 2 is one, byte 3 of word 9 specifies the channel-path identifier (CHPID) of the first channel path that the channel subsystem is to attempt to use when there are I/O requests for the specified I/O devices.

Unit Address: When the count field contains a value of zero, byte 0 of word 10 contains the unit address for the specified I/O device. When the count field contains a value that is greater than zero, byte 0 of word 10 contains a unit address that is the first of a range of unit addresses for the specified I/O devices.

Device Number: When the count field contains a value of zero, bytes 2-3 of word 10 contain the binary representation of the device number for the specified I/O device. When the count field contains a value that is greater than zero, bytes 2-3 of word 10 contain a device number that is the first of a range of device numbers for the specified I/O devices.

Control-Unit Validity (CUNV): Byte 0 of word 11 specifies which of the control-unit-number (CUN) fields contain valid information.

Bits 0-7 of the CUNV field correspond, from left to right, with each of the eight CUN fields. When one, a CUNV bit specifies that the corresponding CUN field contains a valid control-unit number. When zero, a CUNV bit specifies that the corresponding CUN field does not contain a valid control-unit number.

When the OC field specifies the add operation, the CUNV field must not contain all zeros. The contents of the valid CUN fields identify the control units that can be used to access the specified I/O devices.

When the OC field specifies the modify operation and the OCQ field specifies add or delete control-unit access, the CUNV field must not contain all zeros. The contents of the valid CUN fields identify control units that are to be added to, or deleted from (respectively) the list of control units that can be used to access the specified I/O devices.

Device-Number Qualifier (DNQ): When the OC field specifies the modify or delete operation, bytes 2-3 of word 11 contain the control-unit number of one of the control units described in the I/O-configuration definition (prior to this change-I/O-device-configuration command) as providing access to the I/O devices that are the object of this CHSC command.

The device-number qualifier distinguishes one I/O device from another within a set of I/O devices that have the same device number. The control-unit number serves this purpose because of the restriction that every I/O device attached to a control unit must have a unique device number, and every I/O device in a shared device cluster must have a unique device number.

Control-Unit Number (CUN): When bits 0-7 of the CUNV field are not all zeros, words 12-15 contain up to eight two-byte control-unit numbers. Each CUN field that is specified as being valid by the contents of the CUNV field contains a unique identifier of a control unit that can be used to access the specified I/O devices.

Figure 10:
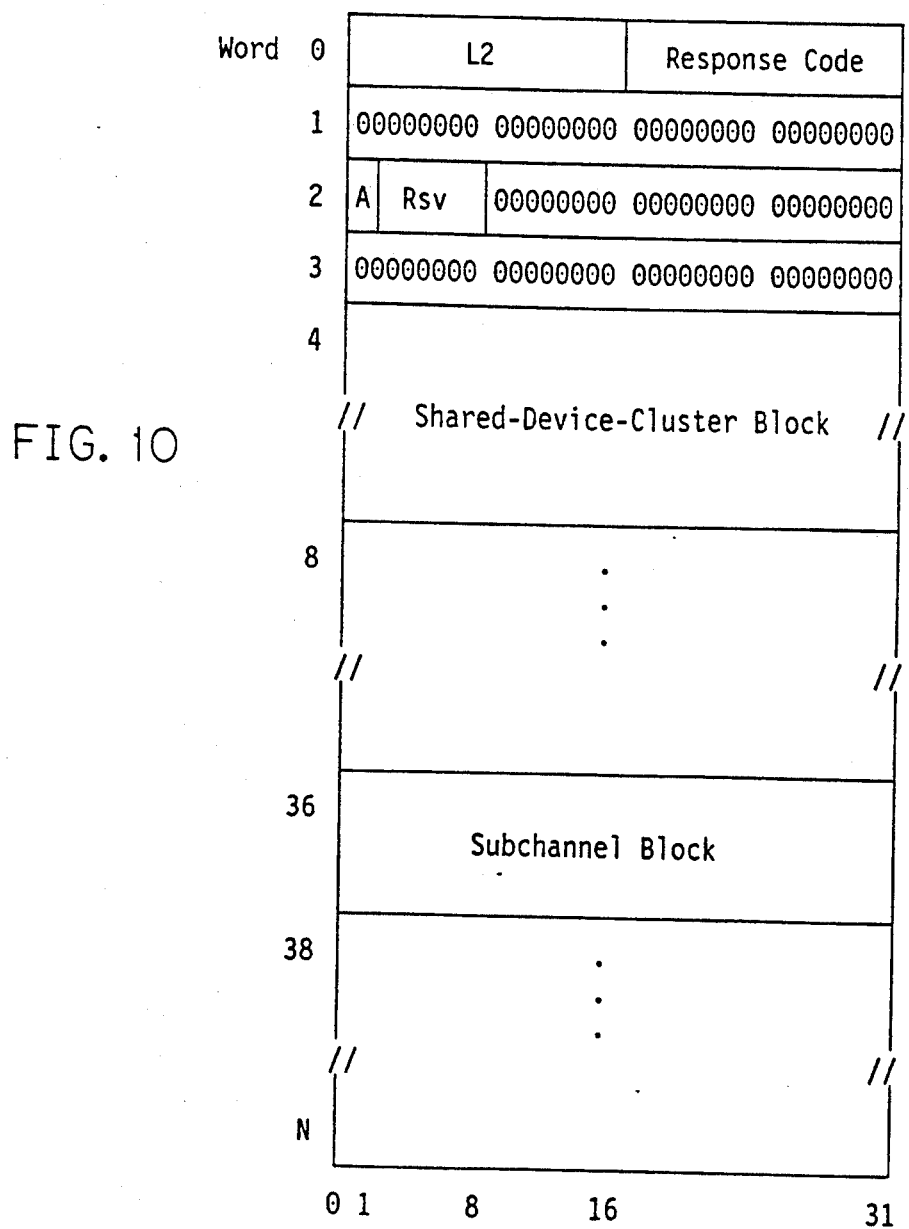
FIG. 10 is a block diagram of a command-response block for the change-I/O-device-configuration command.

The command-response block for change I/O-device configuration has the format shown in FIG. 10 wherein its contents are defined as follows:

L2: Bytes 0-1 of word 0 specify the length in bytes of the command-response block. The length depends on the response code that is stored in the response-code field as a result of the attempt to execute the change-I/O-device-configuration command, and on the type and amount of information to be stored when a response code of 0001 hex is stored.

When a response code of 0001 hex is stored in the response-code field, eight 16-byte shared-device-cluster (SDC) blocks are stored and one or more eight-byte subchannel blocks may be stored in the response-data area of the response block. The L2 field specifies a command-response-block length of 144 bytes, plus eight bytes for every subchannel block (if any) that is stored.

When a response code other than 0001 hex is stored in the response-code field, no SDC blocks or subchannel blocks are stored as a result of the attempt to execute the command, and L2 specifies a length of eight bytes for the command-response block.

Response Code: Bytes 2-3 of word 0 contain a 16-bit unsigned binary integer that describes the results of the attempt to execute the change-I/O-device-configuration command. The valid response codes are 0001, 0003, 0004 hex, and the command-specific response codes listed below in the section .Special Conditions.

When the OC field of the command-request block specifies the add, modify, or delete operation and the response-code field contains 0001 hex, the channel subsystem has successfully completed the requested change to the I/O-configuration definition.

When the OC field of the command-request block specifies the store-additional-information operation and the response-code field contains 0001 hex, or when the response-code field contains a response code other than 0001 hex (regardless of the contents of the OC field), no change is made to the I/O-configuration definition, the I/O-configuration-changed condition in the channel subsystem is not affected, and the contents of the program-parameter field are ignored.

When execution of the change-I/O-device-configuration command results in condition code 1 being set, the channel subsystem has been given the initiative to asynchronously attempt to perform the requested change to the I/O-configuration definition. The completion of that attempt is indicated by means of a CHSC-subchannel I/O interruption with the results of the attempt specified by the response code in the command-response block.

Reserved Words 1 and 3 and bits 1-31 of word 2 contain zeros.

Additional Information (A): When one, bit 0 of word 2 specifies that the channel subsystem has additional shared-device-cluster (SDC) blocks or additional subchannel blocks that cannot be contained in this command-response block. When zero, bit 0 of word 2 specifies that the channel subsystem has no SDC or subchannel blocks in addition to those (if any) that are contained in this command-response block.

The execution of a change-I/O-device configuration command that specifies the add, modify (with add or delete control-unit access) or delete operation can result in the creation of more SDC or subchannel blocks than can be contained in the command-response block. In this case, the channel subsystem creates a set of command-response blocks. The first of the set of command-response blocks is provided as part of the execution of the change-I/O-device configuration command that caused the set of command-response blocks to be created. The program can obtain the remaining command-response blocks by repeatedly executing the change-I/O-device-configuration command with the store-additional-information operation specified. The last command-response block of the set has an A bit that is zero.

If the program continues to request additional command-response blocks after all of the command-response blocks of a set have been stored, the channel subsystem continues to provide them by starting at the beginning of the set and providing them in the same order as they were previously provided. The set of command-response blocks is discarded by the channel subsystem when the first attempt is made to execute any change-configuration command other than the change-I/O-device configuration command (with an OC field that specifies the store-additional-information operation) following the command that caused the set of command-response blocks to be created.

Shared-Device-Cluster (SDC) Blocks: Words 4-35 contain eight 16-byte shared-device-cluster (SDC) blocks. Each SDC block that is specified as being valid describes a shared device cluster that contains one or more of the I/O devices that are specified in the command-request block of the change-I/O-device-configuration command that caused the SDC block to be created.

A shared device cluster is either a single control unit that provides access to at least one I/O device but does not share access to I/O devices with any other control unit, or it is a collection of control units and I/O devices that are connected in such a way that for any division of the total collection of control units into two subsets, at least one I/O device is shared by at least one control unit from each subset.

The SDC block has the format shown in FIG. 7 wherein its contents are defined as follows:

SDC Validity Bit (S): When one, bit 0 of word 0 specifies that the associated SDC block is valid. When zero, bit 0 of word 0 specifies that the associated SDC block is not valid and there are no subsequent SDC blocks in the command-response block that are valid.

PN Validity Bit (P): When one, bit 1 of word 0 specifies that the PN field contains a valid partition number. When zero, bit 1 of word 0 specifies that the contents of the PN field are meaningless. The P bit can be one only when the CPC is in LPAR mode.

Reserved: Bits 2-15 of word 0 and byte 0 of word 1 are reserved and contain zeros.

Shared-Device-Cluster (SDC) Number: Bytes 2-3 of word 0 contain an SDC number that identifies the shared device cluster described by this SDC block. Within an I/O-configuration definition, every SDC has a unique number.

Partition Number (PN): When the CPC is in LPAR mode and the P bit is one, byte 1 of word 1 contains the partition number of the partition from which the specified SDC is recognized.

Path Mask - 1 (PM-1): Byte 2 of word 1 specifies the CHPID fields in words 2-3 that identify all of the channel paths that are described in the I/O-configuration definition for the specified SDC. Each bit of the PM-1 field corresponds one-for-one, by relative position, with each of the CHPID fields in words 2-3. A PM-1 bit stored as one specifies that the contents of the corresponding CHPID field identifies a channel path for the specified SDC. A PM-1 bit stored as zero specifies that the contents of the corresponding CHPID field have no meaning.

Path Mask - 2 (PM-2): When the CPC is in LPAR mode, byte 3 of word 1 specifies the CHPID fields in words 2-3 that identify the channel paths for the specified SDC that are configured to the specified partition. Each bit of the PM-2 field corresponds one-for-one, by relative position, with each of the CHPID fields in words 2-3. A PM-2 bit stored as one specifies that the contents of the corresponding CHPID field identifies a channel path for the specified SDC and the specified partition. A PM-2 bit stored as zero specifies that the contents of the corresponding CHPID field have no meaning.

A PM-2 bit can be one only if the corresponding bit of the PM-1 field is one. When the CPC is operating in native mode, the PM-2 field has no meaning.

Channel-Path Identifiers (CHPIDs): Words 2-3 contain eight one-byte CHPID fields. The CHPID fields that correspond to the bits of the PM-1 field that are ones contain the CHPIDs of channel paths for the specified SDC. The contents of CHPID fields that correspond to the bits of the PM-1 field that are zeros are meaningless.

Subchannel Blocks: When the L2 field contains a value greater than 0090 hex, words 36-N contain one or more eight-byte subchannel blocks. Each subchannel block describes a subchannel that is affected by the requested change to the I/O configuration.

The subchannel block has the format shown in FIG. 8 wherein its contents are defined as follows:

Status: Byte 0 of word 0 contains information about the status of the corresponding I/O device. The meaning of bits 0-7 is as follows:

| Bits | Meaning |
| --- | --- |
| 0 | When one, bit 0 of word 0 specifies that the installed parameters for the specified subchannel have been set to the initialized state. When zero, bit 0 of word 0 specifies that the installed parameters for the specified subchannel have been modified but they are not set to the initialized state. |
| 1 | When one, bit 1 of word 0 specifies that the PN field contains a valid partition number. When zero, bit 1 of word 0 specifies that the contents of the PN are meaningless. The P bit can be one only when the CPC is in LPAR mode. |
| 2 | When the OC field of the command-request block of the change-I/O-device-configuration command that caused this subchannel block to be created specifies the modify (delete control-unit access) or delete operation, bit 2 specifies whether a dedicated-allegiance condition existed or whether the channel subsystem was in the process of accepting status that contained unit check when the modify (delete control-unit access) or delete operation was performed for the specified I/O device. When zero, bit 2 specifies that a dedicated-allegiance condition did not exist. When one, bit 2 specifies that a dedicated-allegiance condition did exist, and bit 3 of the status field specifies whether the channel subsystem was able to clear the associated contingent-allegiance condition at the device. When the OC field of the command-request block of the change-I/O-device-configuration command that caused this subchannel block to be created does not specify the modify (delete control-unit access) or delete operation, bit 2 has no meaning. |
| 3 | When bit 2 of the status field has meaning and is one, bit 3 specifies whether the channel subsystem was able to clear the contingent-allegiance condition at the specified I/O device. When zero, bit 3 specifies that the channel subsystem was able to clear the contingent-allegiance condition (which could result in zero sense data). When one, bit 3 specifies that the channel subsystem was unable to clear the contingent-allegiance condition. When bit 2 of the status field has no meaning or has meaning and is zero, bit 3 has no meaning. |
| 4 | The OC field of the command-request block of the change-I/O-device-configuration command that caused this subchannel block to be created specifies the modify (delete control-unit access) or delete operation, bit 4 specifies whether an I/O operation was in progress when the modify (delete control-unit access) or delete operation was performed for the specified I/O device. When zero, bit 4 specifies that an I/O operation was not in progress. When one, bit 4 specifies that an I/O operation was in progress, and bit 5 of the status field specifies whether the channel subsystem was able to terminate the I/O operation at the specified I/O device. When the OC field of the command-request block of the change-I/O-device-configuration command that caused this subchannel block to be created does not specify the modify (delete control-unit access) or delete operation, bit 4 has no meaning. |
| 5 | When bit 4 of the status field has meaning and is one, bit 5 specifies whether the channel subsystem was able to terminate the I/O operation at the specified I/O device. When zero, bit 5 specifies that the channel subsystem was able to terminate the I/O operation at the I/O device. When one, bit 5 specifies that the channel subsystem was unable to terminate the I/O operation at the I/O device. When bit 4 of the status field has no meaning or has meaning and is zero, bit 5 has no meaning. |
| 6 | The OC field of the command-request block of the change-I/O-device-configuration command that caused this subchannel block to be created specifies the modify (delete control-unit access) or delete operation, bit 6 specifies whether the enabled bit (bit 8 of word 1 of the PMCW) was one or zero for the specified subchannel when the channel subsystem started to perform the requested operation. When zero, bit 6 specifies that the enabled bit was zero. When one, bit 6 specifies that the enabled bit was one. The OC field of the command-request block of the change-I/O-device-configuration command that caused this subchannel block to be created does not specify the modify (delete control-unit access) or delete operation, bit 6 has no meaning. |
| 7 | When the OC field of the command-request block for |

| Bits | Meaning |
|---|---|
| | the change-I/O-device-configuration command that caused this subchannel block to be created specifies the modify (delete control-unit access) or delete operation and the CPC is in LPAR mode, bit 7 specifies whether the interruption-interlock control bit (bit 24 of word 6 of the PMCW) was one or zero for the specified subchannel when the channel subsystem started to perform the requested operation. When zero, bit 7 specifies that the interruption-interlock bit was zero. When one, bit 7 specifies that the interruption- interlock bit was one.<br>When the OC field of the command-request block of the change-I/O-device-configuration command that caused this subchannel block to be created does not specify the modify (delete control-unit access) or delete operation, bit 7 has no meaning. |

Reserved: Byte 1 of word 0 and byte 0 of word 1 are reserved and are zeros.

Device Number: Bytes 2-3 of word 0 contain the binary representation of the device number for the I/O device that is associated with the specified subchannel.

Partition Number (PN): When the CPC is in LPAR mode and bit 1 of the status field is one, byte 1 of word 1 contains the partition number of the partition with which the specified subchannel is associated. Otherwise, the contents of the PN field have no meaning.

Subchannel Number: Bytes 2-3 of word 1 specify the subchannel to which the information in this subchannel block applies.

Associated Functions

Depending on the operation specified by the OC and OCQ fields in the command-request block, and depending on the status of the specified I/O devices, when a response code of 0001 hex is stored in the command-response block, associated functions (other than changing the I/O-configuration definition) may have been performed. This section describes the associated functions and the conditions under which they occur.

In all cases described in this section that state the need for the channel subsystem to issue the clear signal to an I/O device, the rules for selecting a channel path (when the use of a specific channel path is not stated) and the actions for unusual conditions when attempting to select the I/O device are the same as for CLEAR SUBCHANNEL. As with CLEAR SUBCHANNEL, the possibility exists that the channel subsystem cannot successfully issue the clear signal.

1. When the CPC is in LPAR mode and subchannels are added by means of the add or modify (add control-unit access) operation because the associated I/O devices can be accessed, for the first time, by one or more partitions other than the partition associated with the execution of the change-I/O-device-configuration command, the other partitions (except for System/370-mode partitions) are notified of this event by means of channel reports. A subchannel-installed-parameters-initialized channel report is presented to the other partitions for each applicable I/O device.
2. When the CPC is in LPAR mode and access to the specified I/O devices is modified by means of the modify (add or delete control-unit access) operation, such that they can be accessed differently by one or more partitions other than the partition associated with the execution of the change-I/O-device-configuration command, the other partitions (except for System/370-mode partitions) are notified of this event by means of channel reports. A subchannel-installed-parameters-modified channel report is presented to the other partitions for each applicable I/O device.
3. When the CPC is in LPAR mode and subchannels are deleted as a result of the delete or modify (delete control-unit access) operation, because the associated I/O devices can no longer be accessed by one or more partitions other than the partition associated with the execution of the change-I/O-device-configuration command, the other partitions (except for System/370-mode partitions) are notified of this event by means of channel reports. A subchannel-installed-parameters-initialized channel report is presented to the other partitions for each applicable I/O device. The following items describe associated functions that are performed as part of the delete operation.
4. When a request is made to delete an I/O device that is attached to one or more serial-I/O channel paths, the following operations are performed for each of those channel paths:
   a. Initiative, if any, to request stacked status is cleared.
   b. Initiative, if any, to perform channel-initiated command retry is cleared.
   c. Initiative, if any, to perform channel-initiated unit check is cleared.
5. If a subchannel is idle when a request is made to delete the associated I/O device, the channel subsystem examines the subchannel to determine whether a dedicated allegiance exists for that subchannel. If a dedicated allegiance exists for the subchannel, this condition is cleared, and an attempt is made to clear the associated contingent allegiance at the I/O device. The clear signal is issued on the last path used. If this path is unavailable (that is, its PAM bit is zero), then the clear signal is not issued.
6. If a subchannel is suspended or function-pending when a request is made to delete the associated I/O device, the channel subsystem clears this condition, and the associated functions (start, clear, halt) are not performed.
7. If a subchannel is either subchannel-active or device-active only and disconnected when a request is made to delete the associated I/O device, the channel subsystem attempts to terminate the operation at the I/O device by issuing the clear signal. If the I/O device is disconnected, an attempt is made to select a path so that the clear signal can be issued.
8. If a subchannel is device-active only and connected when a request is made to delete the associated I/O device, the channel subsystem accepts the status and examines it to determine if it includes unit check. If the status includes unit check, the channel subsystem attempts to clear the contingent allegiance at the I/O device by issuing the clear signal in response to the status presentation. In either case, the status that is accepted from the I/O device is discarded, and the subchannel is not made status-pending.
9. If a subchannel is status-pending when a request is made to delete the associated I/O device, the channel subsystem examines the status to determine if it includes unit check. If the status includes unit check, the dedicated-allegiance condition at the subchannel is cleared, and an attempt is made to clear the associated contingent allegiance at the I/O device. The clear signal is issued on the last path used. If this path is unavailable (that is, its PAM bit is zero), then the clear signal is not issued. In any case, the status is discarded, and the subchannel is no longer status-pending.

The following items describe associated functions that are performed as part of the modify (delete control-unit access) operation.

In all cases where the set of affected channel paths includes all channel paths for a subchannel (this can happen when the CPC is in LPAR mode), the subchannel is deleted from the I/O-configuration definition. Unless specified otherwise, the operations described for each case are performed even though the subchannel is to be deleted. The term "affected channel paths" means the set of channel paths to which the specified control units are attached. When access to the specified I/O devices by the specified control units is deleted, access by the affected channel paths is also (implicitly) deleted.

10. When a request is made to delete access by a control unit to an I/O device and the control unit is attached to one or more serial-I/O channel paths, the following operations are performed for each of those channel paths:
  a. Initiative, if any, to request stacked status is cleared.
  b. Initiative, if any, to perform channel-initiated command retry is cleared.
  c. Initiative, if any, to perform channel-initiated unit check is cleared.

11. If a subchannel is idle when a request is made to delete access by one or more control units to the associated I/O device, the channel subsystem examines the subchannel to determine whether a dedicated allegiance exists for that subchannel for one of the affected channel paths. If a dedicated allegiance exists, this condition is cleared, and an attempt is made to clear the associated contingent allegiance at the I/O device. The clear signal is issued on the last path used. If this path is unavailable (that is, its PAM bit is zero), then the clear signal is not issued.

12. If an affected subchannel is suspended or only function pending when a request is made to delete access by one or more control units to the associated I/O device, the channel subsystem examines the LPM, the PAM, and the set of affected channel paths to determine if one or more channel paths remain available for selection after access by the affected channel paths is deleted. If no channel path is available for selection, the subchannel remains suspended or function-pending and is made interruption-pending and status-pending with primary, secondary, and alert status. Channel-control check is indicated in the subchannel-status field, and ancillary report is indicated in the subchannel logout. If the subchannel is start-pending or resume-pending only, deferred condition code 3 is also indicated.

If the set of affected channel paths includes all of the channel paths for the subchannel (this can happen when the CPC is in LPAR mode), the operations described in the previous paragraph are not performed. Instead, the channel subsystem clears the suspended or function-pending condition, the associated functions (start, clear, halt) are not performed, and the subchannel is deleted from the I/O-configuration definition by means of setting the device-number-valid bit to zero.

13. If a subchannel is either subchannel-active or device-active only and disconnected when a request is made to delete access by one or more control units to the associated I/O device, the channel subsystem may attempt to terminate the operation at the I/O device, depending on the circumstances described below.
  a. If the subchannel is subchannel-active and connected and the connected channel path belongs to the set of affected channel paths, the channel subsystem clears the working allegiance and active allegiance at the subchannel and attempts to terminate the operation at the I/O device by issuing the clear signal on the connected channel path.
  b. If the subchannel is subchannel-active and disconnected or device-active only and disconnected, the last path used is a channel path that belongs to the set of affected channel paths, and the subchannel is not operating in multipath mode, then the channel subsystem clears the working allegiance at the subchannel and attempts to terminate the operation at the I/O device by issuing the clear signal on the last path used.
  c. If the subchannel is subchannel-active and disconnected or device-active only and disconnected, the last path used is a channel path that belongs to the set of affected channel paths, and the subchannel is operating in multipath mode, then the channel subsystem compares the set of affected channel paths with the set of channel paths in the implied path group. (The implied path group is determined by the ANDing of the logical path mask (LPM) and the path-available mask (PAM).) If all of the channel paths that belong to the implied path group are included in the set of affected channel paths, the channel subsystem clears the working allegiance at the subchannel for all of the channel paths in the implied path group and attempts to terminate the operation at the I/O device by issuing the clear signal on the last path used.

If the set of affected channel paths does not include all of the channel paths for the subchannel and the channel subsystem attempts to issue the clear signal to the I/O device (for the reasons just described), the subchannel is made interruption-pending and status-pending with primary (except when the subchannel was device-active only and disconnected), secondary, and alert status. Channel-control check is indicated in the subchannel-status field, and ancillary report is indicated in the subchannel logout. The channel path used to issue the clear signal is the last path used for the subchannel.

14. If a subchannel is device-active only and connected when a request is made to delete access by one or more control units to the associated I/O device and the connected channel path is included in the set of affected channel paths, the channel subsystem accepts the status. If the status includes unit check, the channel subsystem attempts to clear the contingent allegiance at the I/O device by issuing the clear signal in response to the status presentation, and a dedicated allegiance is not established for the subchannel.

If the set of affected channel paths does not include all of the channel paths for the subchannel, the subchannel is made status-pending with secondary status, and the device status is accepted from the I/O device.

If the set of affected channel paths includes all of the channel paths for the subchannel (this can happen when the CPC is in LPAR mode), the status accepted from the I/O device is discarded and the subchannel is not made status-pending.

15. If a subchannel is status-pending when a request is made to delete access by one or more control units to the associated I/O device, the status includes unit check, and the associated dedicated allegiance is for a channel path that is included in the set of affected channel paths, then the dedicated-allegiance condition at the subchannel is cleared, and an attempt is made to clear the associated contingent allegiance at the I/O device. The channel subsystem attempts to issue the clear signal on the last path used.

If the set of affected channel paths includes all of the channel paths for the subchannel (this can happen when the CPC is in LPAR mode), the status is discarded, and the subchannel is no longer status-pending.

When the CPC is in LPAR mode and the CPC generates channel reports to reflect configuration changes (other than those associated with deleted I/O devices) as a result of executing the change-I/O-device-configuration command, those channel reports are not made pending until the CPC stops operating in configuration mode. This is to prevent actions being taken in response to the channel reports before all of the intended I/O-configuration changes are complete.

Special Conditions

A special condition exists if a response code other than 0001 hex is stored in the response-code field of the command-response block. When a special condition is indicated, the I/O-configuration definition is unchanged. The description of each special condition is followed by symbols that specify characteristics of the associated response code. The symbols and their meanings are as follows:

| Symbol | Meaning |
| --- | --- |
| A | The response code can be specified when the operation code specifies an add operation. |
| M | The response code can be specified when the operation code specifies a modify operation. |
| D | The response code can be specified when the operation code specifies a delete operation. |
| S | The response code can be specified when the operation code specifies the store-additional-information operation. |

The special-condition response codes for the change-I/O-device-configuration command are as follows:

'0003': Response code 0003 hex is presented for the following reasons: (A,M,D,S)
The L1 field contains a value other than 0048 hex.
Bits 2-15 and 20-31 of word 1, bits 4-31 of word 2, word 8, byte 2 of word 9, byte 1 of words 10 and 11, and words 16-17 are not all zeros.

'0004': Response code 0004 hex is presented if the command is not installed on the model. (A,M,D,S)

'0102': Response code 0102 hex specifies that the channel subsystem is not in configuration mode. (A,M,D,S)

'0103': Response code 0103 hex is presented for the following reasons: (A)
One or more of the specified I/O devices are already described in the I/O-configuration definition.
Bits 4-7 of the IODC field are not all zeros.
Bit 2 of the IODC field specifies that the contents of the PCHP field are valid, but the specified channel path is not described as providing access to the specified I/O devices.

The CUNV field contains all zeros.

'0105': Response code 0105 hex specifies that one or more of the specified unit addresses are already used by one or more of the specified control units to access I/O devices other than those specified. (A)

'0106': Response code 0106 hex is presented for the following reasons: (A,M)
One or more of the specified control units are not described in the I/O-configuration definition.
The valid CUN fields do not contain unique values.
Not all of the control units to which the I/O device is to be attached are of the same type.
Not all of the control units to which the I/O device is to be attached use the same interface protocols.
Not all of the channel paths to which the specified control units are attached are of the same type.
Two or more of the specified control units are attached to the same channel path.
The CPC is operating in native mode and the requested configuration change would result in the definition of two or more I/O devices with the same device number.

'0107': Response code 0107 hex is presented for the following reasons: (A,M)
One or more I/O devices are specified as being attached to more control units than the channel subsystem supports per I/O device.
One or more I/O devices are specified as being accessed by more channel paths than the channel subsystem supports per I/O device.
The requested configuration change would result in the access of a shared device cluster by more channel paths than the channel subsystem supports for a single shared device cluster.
The channel subsystem does not support the requested configuration change. When response code 0107 hex is presented for this reason, the operation code may specify the add, modify, or delete operation.

'0108': Response code 0108 hex is presented for the following reasons: (M)
The OCQ field contains a value of zero or a value greater than 3.
The OCQ field specifies add control-unit access, but one or more of the specified control units are already described as providing access to the specified I/O devices.
The OCQ field specifies delete control-unit access, but one or more of the specified control units are not described as providing access to the specified I/O devices.
The OCQ field specifies delete control-unit access, but the deletion would remove all remaining access to one or more of the specified I/O devices.
The OCQ field specifies add or delete control-unit access, and the CUNV field contains all zeros.
Bit 2 of the IODC field specifies that the contents of the PCHP field are valid, but the specified channel path is not described as providing access to the specified I/O devices.

'0109': Response code 0109 hex specifies that the channel subsystem does not have adequate resources to accommodate the requested change to the I/O-configuration definition. (A,M)

'010A': Response code 010A hex specifies that one or more of the specified I/O devices are not described in the I/O-configuration definition. (M,D)

'010D': Response code 010D hex specifies that the requested change to the I/O-configuration definition is not supported by this model. (A,M,D)

'010E': Response code 010E hex is presented for the following reasons: (A,M,D)

The description (in the I/O-configuration definition) of one or more of the specified control units does not include recognition of one or more of the specified unit addresses.

The count field, when applied to either the unit-address field or the device-number field, produces an invalid result.

The control unit specified in the DNQ field does not provide access to one or more of the I/O devices specified by the contents of the count and device-number fields.

'010F': Response code 010F hex specifies that the OC field specifies the store-additional-information operation, but the channel subsystem has no SDC or subchannel blocks to store. (S)

'0110': A condition exists in the CPC that prevents the channel subsystem from obtaining the resources required to make the requested configuration change. For example, the CPC is in LPAR mode, the service processor is in the process of being initialized, and the LPAR hypervisor is unable to serialize the requested configuration change with other configuration-related operations performed by the service processor. (A,M,D)

'0111': Response code 0111 hex specifies that the requested change to the I/O configuration would result in an ambiguous or invalid configuration description. (A,M,D)

While we have illustrated and described the preferred embodiment of our invention, it is to be understood that we do not limit ourselves to the precise construction herein disclosed, and the right is reserved to all changes and modifications coming within the scope of the invention as defined in the appended claims.

Having thus described our invention, what we claim as new, and desire to secure by Letters Patent is:

1. In a computer system having a central processor operated by an operating system, a channel subsystem having a defined configuration for controlling I/O operations, a memory portion addressable by the central processor, and a hardware storage area addressable by said channel subsystem, a mechanism for changing the defined configuration of the channel subsystem comprising:
   configuration control blocks in said hardware storage area for defining the I/O configuration;
   a microcoded I/O processor in the channel subsystem for controlling an I/O operation by use of said configuration control blocks;
   command means in said operating system for creating commands requesting said I/O processor to change said configuration control blocks; and
   command-request blocks in said memory portion addressable by said command means and said microcoded I/O processor for passing said commands from said command means to said I/O processor.

2. The mechanism of claim 1 wherein said configuration control blocks includes the definition of at least one channel, at least one control unit, and at least one I/O device attached to said control unit, each of said channels being identified by a channel path connected between it and one of said control units, and said command means creating a command-request block for a change-channel-path-configuration command for adding or deleting the description of a channel path in said defined configuration.

3. The mechanism of claim 1 wherein said configuration control blocks includes the definition of at least one channel, at least one control unit, and at least one I/O device attached to said control unit, each of said channels being identified by a channel path connected between it and one of said control units, and said command means creating a command-request block for a change-control-unit-configuration command for adding, modifying or deleting the description of a control unit in said defined configuration.

4. The mechanism of claim 3 wherein said command-request block for said change-control-unit-configuration command includes a shared-device-cluster block for describing a shared device cluster that contains one or more I/O devices that are described as being attached to the control unit being added, modified or deleted by said change-control-unit-configuration command.

5. The mechanism of claim 3 wherein said command-request block for said change-control-unit-configuration command further includes one or more subchannel blocks, each subchannel block for describing a subchannel that is affected by the requested change to the I/O configuration by said change-control-unit-configuration command.

6. The mechanism of claim 1 wherein said configuration control blocks includes the definition of at least one channel, at least one control unit, and at least one I/O device attached to said control unit, each of said channels being identified by a channel path connected between it and one of said control units, and said command means creating a command-request block for a change-I/O-device-configuration command for adding, modifying or deleting the description of one or more I/O devices in said defined configuration.

7. The mechanism of claim 6 wherein said command-request block for said change-I/O-device-configuration command includes a shared-device-cluster block for describing a shared device cluster that contains one or more I/O devices that are specified in the command-request block of said change-I/O-device-configuration command.

8. The mechanism of claim 6 wherein said command-request block for said change-I/O-device-configuration command further includes one or more subchannel blocks, each subchannel block describing a subchannel that is affected by the requested change to the I/O configuration by said change-I/O-device-configuration command.

9. The mechanism of claim 1 further comprising:
   command-response blocks in said memory portion addressable by said command means and said microcoded I/O processor for passing status data from said I/O processor to said memory portion; and
   an interrupt mechanism for interrupting said central processor such that said central processor may interrogate said command-response block to receive said status data from said I/O processor.

10. The mechanism of claim 9 wherein said command-response block includes a response code for a special condition indicating said I/O configuration is unchanged by the command of said command-request block.

11. The mechanism of claim 9 wherein said command-response block includes a response code for indicating that an associated function other than changing the I/O configuration definition may have been performed by said microcoded I/O processor in the execution of the command of said command-request block.

* * * * *